(12) United States Patent  
Hristova et al.

(10) Patent No.: US 11,892,568 B2  
(45) Date of Patent: Feb. 6, 2024

(54) DEPTH MAP SENSOR WITH BIN ROTATION

(71) Applicants: STMICROELECTRONICS (RESEARCH & DEVELOPMENT) LIMITED, Marlow (GB); STMicroelectronics (Grenoble 2) SAS, Grenoble (FR)

(72) Inventors: Ivelina Hristova, Edinburgh (GB); Pascal Mellot, Lans en Vercors (FR); Neale Dutton, Edinburgh (GB)

(73) Assignees: STMICROELECTRONICS (GRENOBLE 2) SAS, Grenoble (FR); STMICROELECTRONICS (RESEARCH & DEVELOPMENT) LIMITED, Marlow (GB)

( * ) Notice: Subject to any disclaimer, the term of this patent is extended or adjusted under 35 U.S.C. 154(b) by 681 days.

(21) Appl. No.: 17/074,238

(22) Filed: Oct. 19, 2020

(65) Prior Publication Data

US 2021/0133992 A1 May 6, 2021

(30) Foreign Application Priority Data

Oct. 31, 2019 (EP) .................................. 19306416

(51) Int. Cl.
*G06T 7/50* (2017.01)
*G06F 1/10* (2006.01)
(Continued)

(52) U.S. Cl.
CPC .......... *G01S 7/4865* (2013.01); *G01S 7/4863* (2013.01); *G01S 17/894* (2020.01); *G06F 1/10* (2013.01);
(Continued)

(58) Field of Classification Search
CPC .... G01S 7/4865; G01S 7/4863; G01S 17/894; G01S 7/497; G01S 17/08; G01S 17/89;
(Continued)

(56) References Cited

U.S. PATENT DOCUMENTS 8,355,117 B2 * 1/2013 Niclass .................. G01S 17/36  
356/3.01  
10,067,224 B2  9/2018 Moore et al.  
(Continued)

FOREIGN PATENT DOCUMENTS

EP  3367131 A1  8/2018

*Primary Examiner* — Vijay Shankar  
(74) *Attorney, Agent, or Firm* — Slater Matsil, LLP

(57) ABSTRACT

A depth map sensor includes a first array of first pixels, each first pixel having a first photodetector associated with a pixel circuit that comprises a plurality of first bins for accumulating events. A clock source is configured to generate a plurality of phase-shifted clock signals. A first circuit has a plurality of first output lines coupled to the first array of first pixels. The first circuit is configured to receive the plurality of phase-shifted clock signals. The first circuit includes a first block and a second block. The first block is configured to propagate the plurality of phase-shifted clock signals to the second block during a first period determined by a first enable signal and the second block configured to select to which of the plurality of first output lines each of the plurality of phase-shifted clock signals is applied.

22 Claims, 13 Drawing Sheets

(51) Int. Cl.
  *G06T 15/08* (2011.01)
  *G06T 15/00* (2011.01)
  *G01S 7/4865* (2020.01)
  *G01S 17/894* (2020.01)
  *G01S 7/4863* (2020.01)

(52) U.S. Cl.
  CPC .............. *G06T 7/50* (2017.01); *G06T 15/005* (2013.01); *G06T 15/08* (2013.01); *G06T 2207/10108* (2013.01)

(58) Field of Classification Search
  CPC . G06F 1/10; G06T 7/50; G06T 15/005; G06T 15/08; G06T 2207/10108
  See application file for complete search history.

(56) References Cited

U.S. PATENT DOCUMENTS

| | | | |
|---|---|---|---|
| 10,890,662 B2 * | 1/2021 | Moore | G01S 17/894 |
| 11,209,310 B2 * | 12/2021 | Mellot | G01J 1/44 |
| 2007/0182949 A1 * | 8/2007 | Niclass | G01S 7/491 356/3 |
| 2017/0115381 A1 | 4/2017 | Moore et al. | |
| 2018/0246212 A1 | 8/2018 | Moore et al. | |
| 2021/0063240 A1 * | 3/2021 | Mellot | G01S 17/894 |

\* cited by examiner

DEPTH MAP SENSOR WITH BIN ROTATION

CROSS-REFERENCE TO RELATED APPLICATIONS

This application claims the priority benefit of European Patent application number 19306416.9, filed on Oct. 31, 2019, the content of which is hereby incorporated by reference in its entirety to the maximum extent allowable by law.

TECHNICAL FIELD

The present disclosure relates a depth map sensor with bin rotation.

BACKGROUND

The ability of time-of-flight (ToF) cameras based on single photon avalanche diodes (SPADs) to provide precise photon arrival times makes them popular candidates for depth map sensors. Such ToF cameras generally comprise a laser source such as a vertical-cavity surface-emitting laser (VCSEL) that emits, into an image scene, optical pulses or an optical waveform, and an array of SPADs for detecting the return signal.

In the case of indirect ToF (iToF), the phase of the returned waveform is compared with that of the emitted waveform in order to estimate the time-of-flight, which is then converted into a distance measurement. In current ToF cameras, the returned waveform received by the SPAD array is often detected using circuits that are able to perform a precise time-sampling of events in time windows, also referred to as bins. However, any mismatch in these time windows can lead to non-uniformity of the time-sampling, which can in turn disturb the precise detection of the phase of the returned waveforms and thus degrade the accuracy of the distance measurements.

SUMMARY

The present disclosure relates generally to the field of time of flight (ToF) depth map sensors, and in particular to a circuit and method for operating such sensors.

Embodiments can improve the accuracy of the distance measurement methods and devices for depth map sensors.

One embodiment addresses all or some needs in the prior art for distance measurement methods and devices for depth map sensors.

One embodiment provides a depth map sensor comprising a first array of first pixels, each first pixel comprising at least one first photodetector associated with a pixel circuit comprising a plurality of first bins for accumulating events. A clock source configured to generate a plurality of phase-shifted clock signals. A first circuit has a plurality of first output lines coupled to the first array of first pixels and receives the plurality of phase-shifted clock signal. The first circuit comprises a first block, which propagates the plurality of phase-shifted clock signals to a second block during a first period determined by a first enable signal. The second block is configured to select to which of the plurality of first output lines each of the plurality of phase-shifted clock signals is applied.

According to one embodiment, the depth map sensor comprises a second array of second pixels, each second pixel comprising at least one second photodetector associated with a pixel circuit comprising a plurality of second bins for accumulating events, and a second circuit having a plurality of second output lines coupled to the second array of second pixels, the second circuit receiving the plurality of phase-shifted clock signals from the clock source. The second circuit comprises a third block, which propagates the plurality of phase-shifted clock signals to a fourth block during a second period determined by a second enable signal, wherein the duration of the second period is different to the duration of the first period. The fourth block is configured to select to which of the plurality of second output lines each of the plurality of phase-shifted clock signals is applied.

According to one embodiment, the selection performed by the fourth block is different from the selection performed by the second block.

According to one embodiment, the first array of first pixels is a return pixel array, adapted to be illuminated using at least one light source of the depth map sensor, the at least one light source being configured to transmit light into an image scene. The second array of second pixels is a reference array.

According to one embodiment, a group of first photodetectors of the first array of first pixels of the depth map sensor is illuminated during a first exposure phase. The group of first photodetectors of the first array of first pixels of the depth map sensor is read during a first readout phase, following the first exposure phase. The second photodetectors of the second array of second pixels of the depth map sensor are illuminated, during a second exposure phase, then read, during a second readout phase, the second exposure phase and the second readout phase of second photodetectors being comprised in the first exposure phase of the group of first photodetectors.

According to one embodiment, the first exposure phase comprises a first exposure sub-phase, during which the plurality of phase-shifted clock signals are applied to the plurality of first output lines coupled to the first array of first pixels of the depth map sensor in a first order, and at least one second exposure sub-phase, during which the plurality of phase-shifted clock signals are applied to the plurality of first output lines coupled to the first array of first pixels of the depth map sensor according to a cyclic circular shift.

According to one embodiment, the second exposure phase comprises a third exposure sub-phase, during which the plurality of phase-shifted clock signals are applied to the plurality of second output lines coupled to the second array of second pixels of the depth map sensor in a second order, and at least one fourth exposure sub-phase, during which the plurality of phase-shifted clock signals are applied to the plurality of second output lines coupled to the second array of second pixels of the depth map sensor according to a cyclic circular shift.

According to one embodiment, the first duration is smaller than the second duration.

According to one embodiment, the first duration is between 10 µs and 20 µs, and the second duration is between 50% and 95% of the first duration.

One embodiment provides a method of controlling a first array of first pixels of a depth map sensor comprising propagating, using a first block comprised in a first circuit having a plurality of first output lines coupled to the first array of first pixels, a plurality of phase-shifted clock signals, received by the first circuit and generated by a clock source, to a second block during a first period determined by a first enable signal. Each first pixel comprises at least one first photodetector associated with a pixel circuit comprising a plurality of first bins for accumulating events. The second block selects which of the plurality of first output lines each of the plurality of phase-shifted clock signals is applied.

According to one embodiment, the method comprises propagating, using a third block comprised in a second circuit having a plurality of second output lines coupled to a second array of second pixels, the plurality of phase-shifted clock signals, received by the second circuit from the clock source, to a fourth block during a second period of different duration to the duration of the first period and determined by a second enable signal, wherein each second pixel comprises at least one second photodetector associated with a pixel circuit comprising a plurality of second bins for accumulating events, and selecting, using the fourth block, to which of the plurality of second output lines each of the plurality of phase-shifted clock signals is applied.

According to one embodiment, the selection performed by the fourth block is different from the selection performed by the second block.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures, or to a depth map sensor as orientated during normal use.

Unless specified otherwise, the expressions "around", "approximately", "substantially" and "in the order of" signify within 10%, and preferably within 5%.

In the following disclosure, example embodiments are described with reference to a depth map sensor using a scanned VCSEL source. However, it will be apparent to those skilled in the art that the principles described herein apply equally to depth map sensors using different types of laser light source, which may or may not be scanned.

Figure 1:
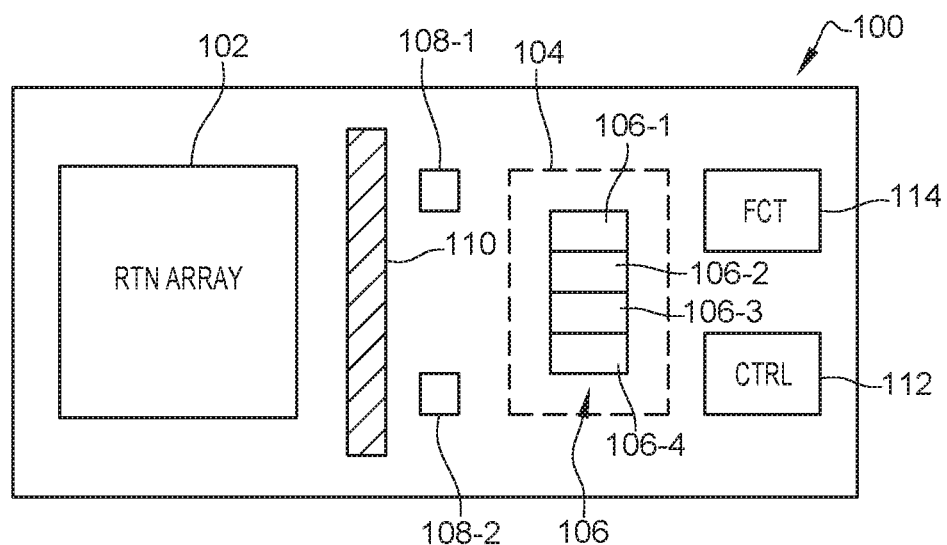
FIG. 1 schematically illustrates, in the form of blocks, a top view of a depth map sensor according to an example embodiment of the present disclosure.

FIG. 1 schematically illustrates, in the form of blocks, a top view of a depth map sensor 100 according to an example embodiment of the present disclosure.

According to this embodiment, the depth map sensor 100 comprises a pixel array (RTN ARRAY) 102. The pixel array 102 is for example a return array that is adapted to be scanned in synchronization with an illumination of an image scene. Each pixel of the return array 102 comprises at least one photodetector (not shown in FIG. 1). The photodetectors of the return array 102 may be single-photon avalanche diodes (SPADs). In alternative embodiments, the photodetectors of the return array 102 may be photodiodes, which are for example fabricated using complementary metal-oxide-semiconductor (CMOS) technology.

The image scene is illuminated by an illumination system 104. According to this embodiment, the illumination system 104 comprises a plurality of light sources 106. The illumination system 104 is, for example, a scanned array of vertical-cavity surface-emitting lasers (VCSELs), where each light source 106 corresponds to at least one VCSEL. The depth map sensor 100 may include an optical system (not shown in FIG. 1) comprising at least one lens and/or diffuser, which partially or entirely covers the illumination system 104.

In the following disclosure, the letter "N" denotes the total number of light sources 106 belonging to the illumination system 104 of the depth map sensor 100. In FIG. 1, four light sources 106 (106-1, 106-2, 106-3 and 106-4) arranged in a one by four array are represented, although no limitation is implied as to the number and the arrangement of light sources 106 in the illumination system 104. For example, more generally, the array could be an i by j array of light sources 106, where i and j are each integers equal to one or more and i times j equals N. In some embodiments, the illumination system 104 is a scanned laser illumination system comprising ten VCSELs arranged in a one by ten array. In such a case, each light source 106 is thus a laser light source 106 comprising one VCSEL, and N equals ten.

More generally, the illumination system 104 successively illuminates various regions of the image scene, the regions potentially being partially overlapping. In some alternative embodiments (not shown in FIG. 1), the illumination system 104 comprises only one light source 106, e.g. a single VCSEL, and an optical device configured to scan the image scene. Such an optical device may comprise at least one mirror which is tilted at discrete angles with respect to the light source 106, thus deflecting the emitted light towards a plurality N of regions within the image scene, which again may be partially overlapping.

In some embodiments, the depth map sensor 100 further comprises at least one further pixel array, for example two further pixel arrays 108-1 and 108-2 as depicted in FIG. 1. The further pixel arrays 108-1 and 108-2 may act as reference arrays. In such a case, the reference pixel arrays 108-1 and 108-2 are illuminated by the light that is emitted internally by the illumination system 104. The reference pixel arrays 108-1 and 108-2 are for example illuminated by a portion of light that is reflected by the optical system (not shown in FIG. 1) covering the illumination system 104. The reference arrays 108-1 and 108-2 are preferably placed as close as possible to the illumination system 104, as they aim to capture the light directly after its emission by the light sources 106 of the illumination system 104.

According to the orientation of FIG. 1, the reference arrays 108-1 and 108-2 are respectively an upper/top reference array and a lower/bottom reference array. In one embodiment where the illumination system 104 is a vertical one by N array of VCSELs, where N is equal to or greater than two, the upper reference array 108-1 may be used in association with the top half of the VCSEL array, whereas the lower reference array may be associated with the bottom half of the VCSEL array. This enables the reference arrays 108-1 and 108-2 to capture light that comes out of the illumination system 104 close to the location where it is emitted, that is with a minimum attenuation.

In FIG. 1, the return array 102 is separated from the reference arrays 108-1 and 108-2 and from the illumination system 104 by an optical barrier 110. The optical barrier 110 prevents the return array 102 from being directly illuminated by the illumination system 104, or by a portion of light that may be reflected by the optical system (not shown in FIG. 1) covering the illumination system 104. The light that reaches the return array 102 thus mainly originates from the image scene and not from the inside of the depth map sensor 100.

The return array 102 and the reference arrays 108-1 and 108-2 are for example driven by a control circuit (CTRL) 112. The light sources 106 of the illumination system 104 are also for example driven by the control circuit 112. In some embodiments, the control circuit 112 is a microcontroller, an application-specific integrated circuit (ASIC) or a field-programmable gate array (FPGA).

The depth map sensor 100 may further comprise several other elements or circuits which are symbolized, in FIG. 1, by a single functional block (FCT) 114.

Each light source 106 of the illumination system 104 emits or transmits, into the image scene, optical pulses or an optical waveform. These optical pulses or this optical waveform are/is captured, right after their/its emission, by at least one of the reference arrays 108-1, 108-2. A return signal, caused by the reflection of these optical pulses or this optical waveform in the image scene, is then detected by the return array 102.

According to one embodiment, the depth map sensor 100 is configured to perform indirect ToF (iToF). In such a case, the phase of the returned waveform, captured by the return array 102, is compared with that of the emitted waveform, captured by at least one of the reference arrays 108-1, 108-2, in order to estimate the time-of-flight, which is then converted into a distance measurement.

Figure 2:
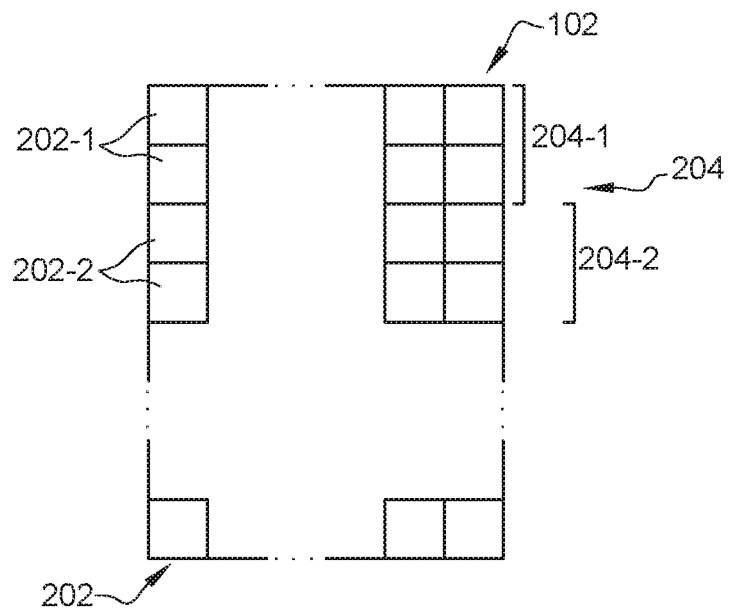
FIG. 2 schematically illustrates a pixel array of the depth map sensor of FIG. 1 according to an example embodiment.

FIG. 2 schematically illustrates the return array 102 of the depth map sensor 100 of FIG. 1 according to an example embodiment.

The return array 102 is an array of pixels 202. In practice, the return array 102 may be a rectangular array comprising, in one example, three hundred and thirty two lines of pixels 202 and two hundred and fifty two columns of pixels 202.

In some embodiments, the reference arrays 108-1 and 108-2 (FIG. 1) are also arrays of pixels similar to the pixels 202 of the return array 102. The reference arrays 108-1 and 108-2 may each comprise fewer pixels than the return array 102. In one embodiment, each of the reference arrays 108-1, 108-2 may be a square array comprising twelve lines of pixels and twelve columns of pixels.

According to the embodiment of FIG. 2, the return array 102 is divided into several clusters 204 of pixels 202. The clusters 204 are defined here as regions of the return array 102, each comprising at least one pixel 202 and preferably a group of adjacent pixels 202.

In the example depicted in FIG. 2, only two clusters 204 are shown, each cluster 204 comprising two adjacent rows of pixels 202. More specifically, a cluster 204-1 comprises two adjacent rows of pixels 202-1 and another cluster 204-2 comprises two adjacent rows of pixels 202-2.

The clusters 204 are shown in FIG. 2 as rectangular-shaped regions of the return array 102, each cluster 204 comprising a same number of pixels 202, though no limitation is implied as to the shapes of the clusters 204 and number of pixels 202 in each cluster 204. In particular, each of the clusters 204 may have any shape and may comprise any number of pixels 202, which may or may not be adjacent. Although two clusters 204 (204-1 and 204-2) are represented in FIG. 2, the return array 102 may comprise any number of clusters 204, for example, ten clusters 204.

Figure 3:
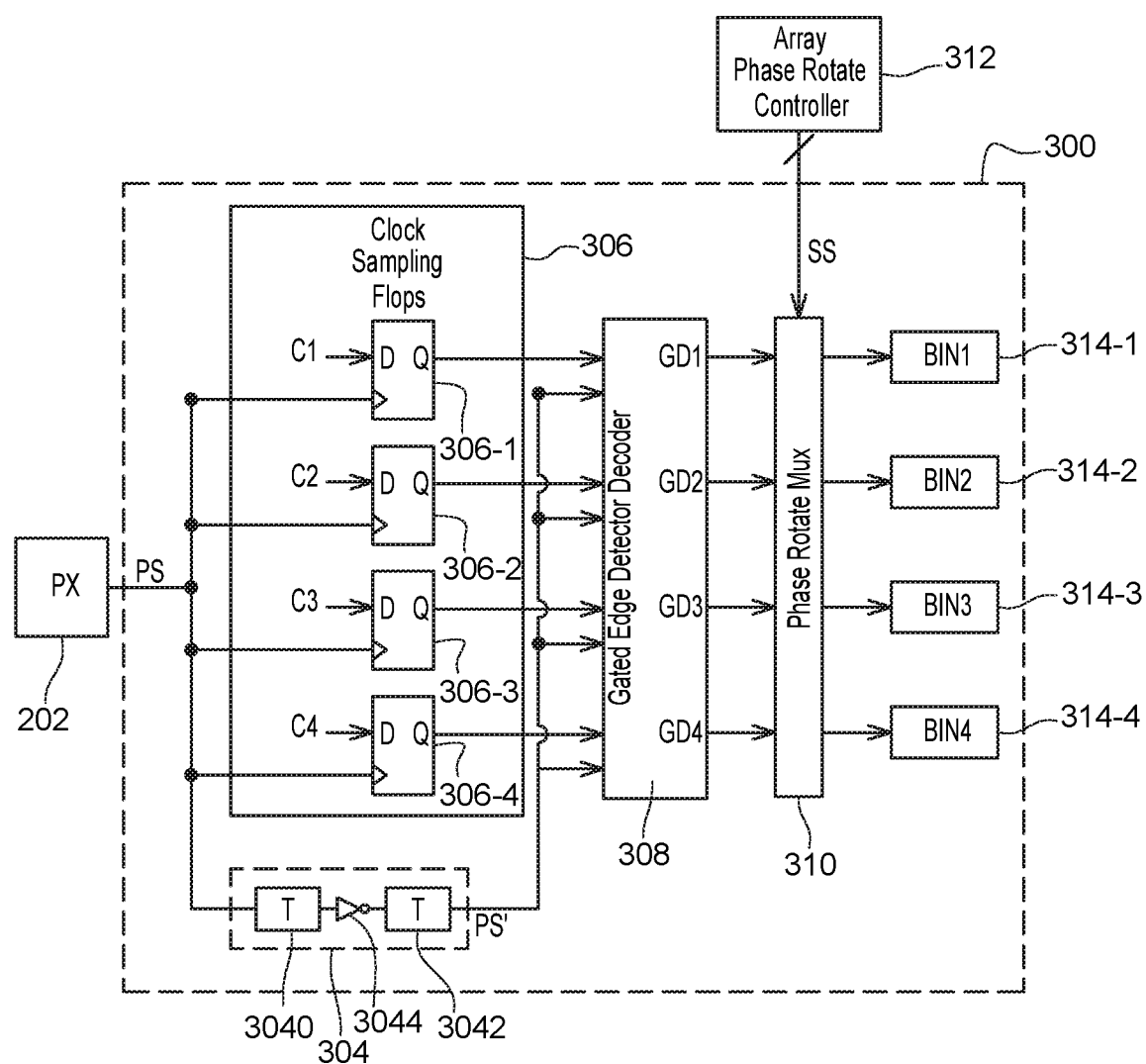
FIG. 3 schematically illustrates, in the form of blocks, an example of a pixel circuit.

FIG. 3 schematically illustrates, in the form of blocks, an example of a pixel circuit 300. The pixel circuit 300 of FIG. 3 is similar to pixel circuits that are set forth in U.S. Pat. Pub. No. 2018/0246212, which is assigned to the present Applicant and is hereby incorporated by reference herein in its entirety.

As depicted in FIG. 3, the pixel circuit 300 is for example associated with one pixel 202 (PX) of the return pixel array 102. The pixel 202 comprises at least one photodetector. For example, the pixel 202 comprises four photodetectors (not shown in FIG. 3) arranged in a two-by-two arrangement. Each photodetector of the pixel 202 is for example a SPAD.

An output signal PS of the pixel 202, which for example originates from combining and pulse-shaping the output signals of at least some of its photodetectors, may be passed to a delay module 304 and to clock sampling flip-flops (Clock Sampling Flops) 306. In the example of FIG. 3, the delay module 304 comprises a pair of delay elements (T) 3040, 3042 and an inverter 3044. The delay module 304 is for example configured to receive the PS signal, to delay this PS signal and to invert it. A delayed inverted version PS' of the PS signal is thus output by the delay module 304. In particular, the delayed signal PS' for example comprises a rising edge generated from a falling edge of each pulse of the PS signal.

In the example shown in FIG. 3, the clock sampling flip-flops 306 are configured to sample four phase-shifted clock signals C1, C2, C3 and C4 using the output signal PS of the pixel 202. Each of the four phase-shifted clock signals C1, C2, C3, C4 are for example phase-shifted one with respect to the next by a quarter of a cycle. In such a case, C1 is substantially the inverse of C3, and C2 is substantially the inverse of C4.

In FIG. 3, the clock sampling flip-flops 306 are shown as four D-type flip-flops 306-1, 306-2, 306-3 and 306-4. Each D-type flip-flop 306-1, 306-2, 306-3, 306-4 has a data input (D) coupled to one of the phase-shifted clock signals C1, C2, C3, C4 and a clock input (>) coupled to the PS signal. The output (Q) of each D-type flip-flop 306-1, 306-2, 306-3, 306-4 is coupled to a corresponding input of a gated edge detector decoder (Gated Edge Detector Decoder) 308. An output signal from each D-type flip-flop 306-1, 306-2, 306-3, 306-4 is for example generated if, on the rising edge of a SPAD event pulse, the associated phase-shifted clock signal C1, C2, C3, C4 is high.

The output signal PS' of the delay module 304, which is provided to the gated edge detector decoder 308, is for example used to time the propagation of the detected events through the gated edge detector decoder 308 to a phase rotation multiplexer (Phase Rotate Mux) 310. The gated edge detector decoder 308 for example has four outputs GD1, GD2, GD3 and GD4 as shown in FIG. 3.

The gated edge detector decoder 308 for example outputs a high state on one of its four outputs GD1, GD2, GD3, GD4 if a SPAD event is detected during one of four corresponding time windows. These time windows are described below in more detail with respect to FIG. 4.

The phase rotation multiplexer 310 is for example associated with four ripple counters or bins 314-1 (BIN1), 314-2 (BIN2), 314-3 (BIN3) and 314-4 (BIN4). The phase rotation multiplexer 310 for example further receives a selection signal SS from a phase rotator/selector (Array Phase Rotate Controller) 312. Based on the value of the SS signal, the phase rotation multiplexer 310 selects to which of the four ripple counters BIN1, BIN2, BIN3, BIN4 each output GD1, GD2, GD3, GD4 of the gated edge detector decoder 308 will be applied to.

In other words, the phase rotation multiplexer 310 dispatches each of the outputs GD1, GD2, GD3, GD4 to a corresponding ripple counter BIN1, BIN2, BIN3, BIN4 selected by the phase rotator/selector 312 using the SS signal. The ripple counters BIN1, BIN2, BIN3 and BIN4 are thus receiving, as an input, the outputs from the multiplexer 310 and are configured to count the events detected by the pixel circuit 300 in order to generate a histogram.

Figure 4:
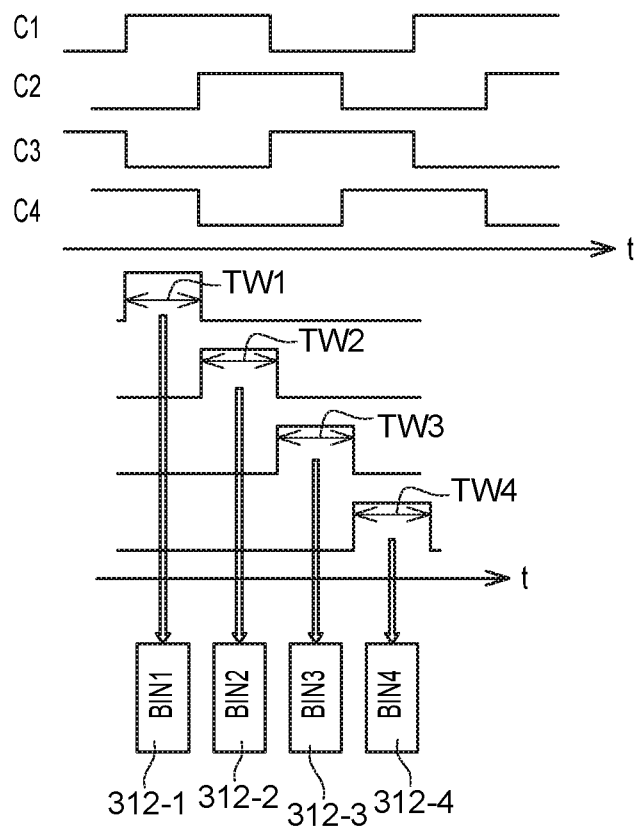
FIG. 4 is a timing diagram representing signals in the pixel circuit of FIG. 3.

FIG. 4 is a timing diagram representing signals in the pixel circuit of FIG. 3.

FIG. 4 corresponds to an ideal case, where the four phase-shifted clock signals C1, C2, C3 and C4 are for example square wave signals phase-shifted one to the next by exactly a quarter period. In FIG. 4, the signals C1 to C4 are phase-shifted with respect to each other such that the signals C2, C3 and C4 respectively exhibit phase-shifts of 90°, 180° and 270° compared to the signal C1.

The gated edge detector decoder 308 (FIG. 3) is for example configured to output a high state:
  on its output GD1, if an event is detected in a time window TW1 comprised between a rising edge of the signal C1 and a rising edge of the signal C2;
  on its output GD2, if an event is detected in another time window TW2 comprised between a rising edge of the signal C2 and a rising edge of the signal C3;
  on its output GD3, if an event is detected in yet another time window TW3 comprised between a rising edge of the signal C3 and a rising edge of the signal C4; and
  on its output GD4, if an event is detected in yet another time window TW4 comprised between a rising edge of the signal C4 and a rising edge of the signal C1.

In the example of FIG. 4, SPAD events detected within the time windows TW1, TW2, TW3 and TW4 are dispatched, by the phase rotation multiplexer 310 (FIG. 3), to the ripple counters BIN1, BIN2, BIN3 and BIN4, respectively. The time windows TW1, TW2, TW3 and TW4 have a same width in the example of FIG. 4.

However, unlike what is shown in FIG. 4, the period and/or the waveform of the phase-shifted clock signals C1, C2, C3 and C4 may not all be the same. Furthermore, whereas the signals C2, C3 and C4 theoretically exhibit phase-shifts of 90°, 180° and 270° compared to the signal C1, in practice, due to the different conduction paths of these signals, the phase shifts may be different. Thus, the time windows TW1, TW2, TW3 and TW4 may for example exhibit slight differences in duration between them. This may introduce inaccuracies, as the probability of detecting an event may vary because the time intervals used for the detection are not equal.

In order to mitigate the impacts of possible discrepancies between the phase-shifted clock signals C1, C2, C3 and C4, the pixel circuit 300 of FIG. 3 may perform a "phase rotation", or "time-domain averaging" as will now be described in relation with FIGS. 5 to 8.

FIGS. 5 to 8 are further timing diagrams representing signals in the pixel circuit of FIG. 3. In particular, FIGS. 5 to 8 correspond to a non-ideal case, where the phase-shifted clock signals C1, C2, C3 and C4 are not separated by equal phase shifts. Such a discrepancy is for example caused by the physical implementation of circuits and conduction paths (not shown) configured to propagate the signals C1, C2, C3 and C4 from a timing source to the pixel circuit.

More specifically, in the example of FIGS. 5 to 8:
  the phase shift between the signals C1 and C2 is equal to the phase shift between the signals C4 and C1;
  the phase shift between the signals C2 and C3 is larger than the phase shift between the signals C1 and C2; and
  the phase shift between the signals C3 and C4 is smaller than the phase shift between the signals C1 and C2.

Figure 5:
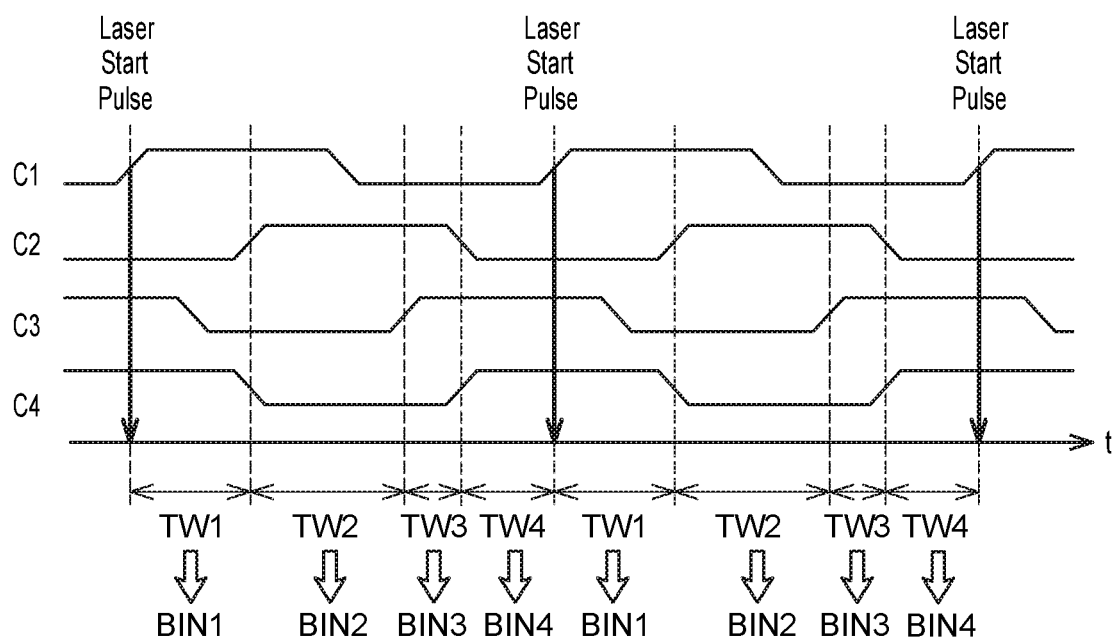
FIGS. 5 to 8 are further timing diagrams representing signals in the pixel circuit of FIG. 3.

FIG. 5 shows, for example, a phase rotation setting comparable to FIG. 4, where the phase rotation multiplexer 310 is configured to couple:
  the output GD1, corresponding to the time window TW1, to the ripple counter BIN1;
  the output GD2, corresponding to the time window TW2, to the ripple counter BIN2;
  the output GD3, corresponding to the time window TW3, to the ripple counter BIN3; and
  the output GD4, corresponding to the time window TW4, to the ripple counter BIN4.

In the phase rotation setting of FIG. 5, laser light pulses (Laser Start Pulse), symbolized by vertical arrows in FIGS. 5 to 8, are for example emitted by a laser source at rising edges of the signal C1. However, as mentioned above, the phase shift between the signals C2 and C3 is larger than it should be and the phase shift between the signals C3 and C4 is smaller than it should. This may introduce inaccuracies in the distance measurement. In fact, the probability of detecting an event is higher during the time window TW2, due to the fact that the time window TW2 is larger than the time windows TW1 and TW4 and is lower during the time window TW3, due to the fact that the time window TW3 is narrower than the time windows TW1 and TW4.

In order to mitigate such a difference in width of the time windows, the phase rotator/selector 312 is configured to perform, during consecutive exposure sub-phases, the histogram generation using each of the time windows TW1 to TW4 to capture the events for each of the four bins of the histograms, as will now be described with reference to FIGS. 6 to 8.

Figure 6:
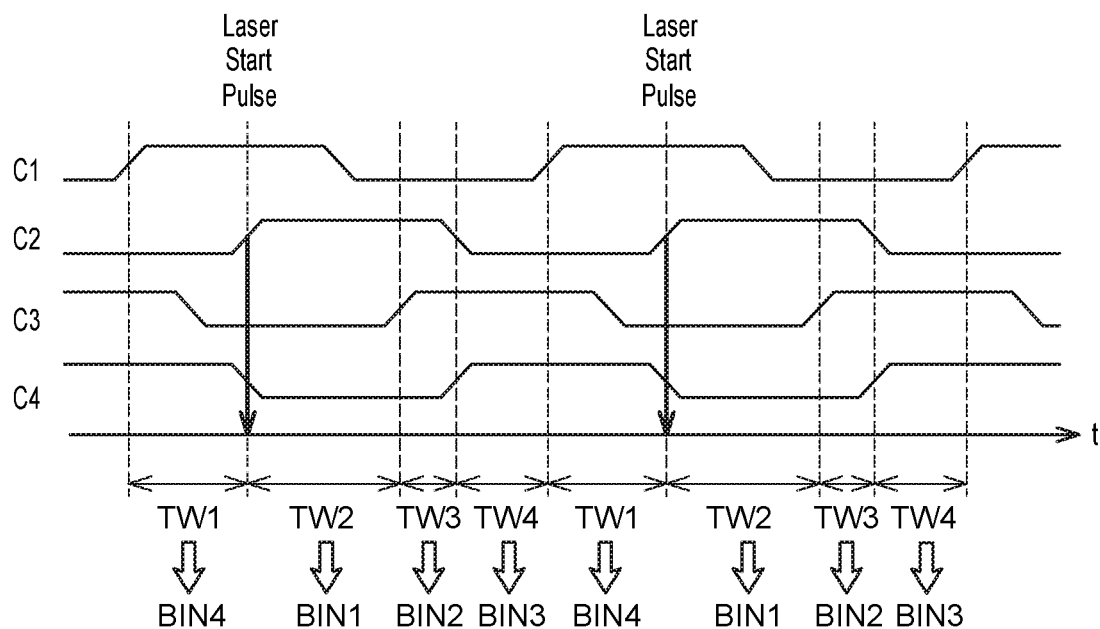

FIG. 6 shows, for example, another phase rotation setting where the phase rotator/selector 312 is configured to control an emission of a light pulse (Laser Start Pulse) at rising edges of the signal C2. The phase rotation multiplexer 310 is configured to couple:

the output GD1, corresponding to the time window TW1, to the ripple counter BIN4;
the output GD2, corresponding to the time window TW2, to the ripple counter BIN1;
the output GD3, corresponding to the time window TW3, to the ripple counter BIN2; and
the output GD4, corresponding to the time window TW4, to the ripple counter BIN3.

Figure 7:
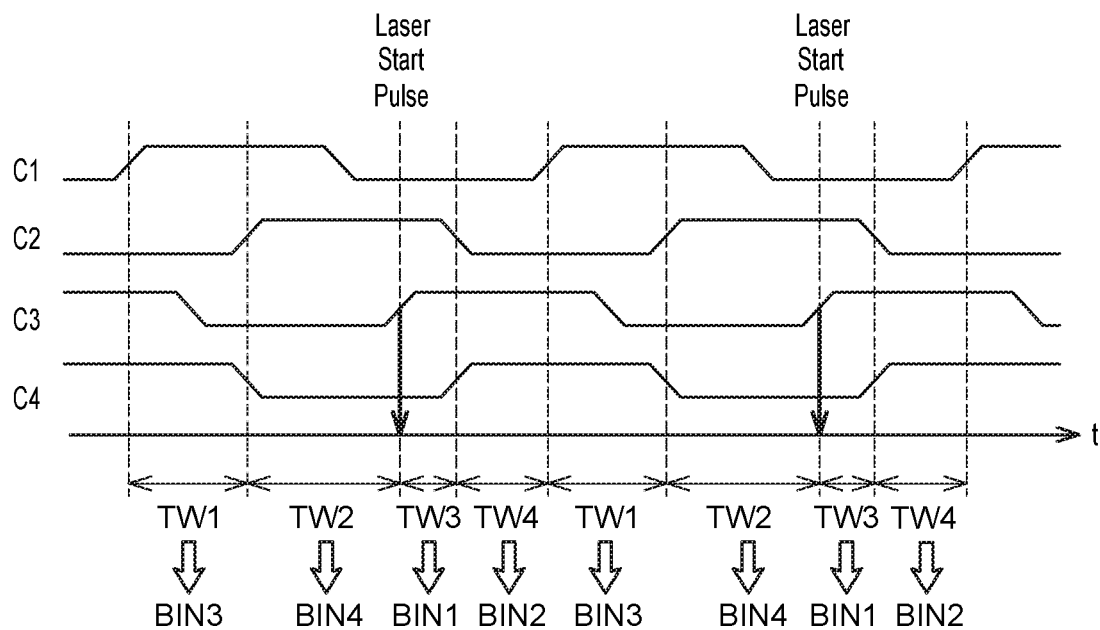

FIG. 7 shows, for example, yet another phase rotation setting where the phase rotator/selector 312 is configured to control an emission of a light pulse (Laser Start Pulse) at rising edges of the signal C3. The phase rotation multiplexer 310 is configured to couple:

the output GD1, corresponding to the time window TW1, to the ripple counter BIN3;
the output GD2, corresponding to the time window TW2, to the ripple counter BIN4;
the output GD3, corresponding to the time window TW3, to the ripple counter BIN1; and
the output GD4, corresponding to the time window TW4, to the ripple counter BIN2.

Figure 8:
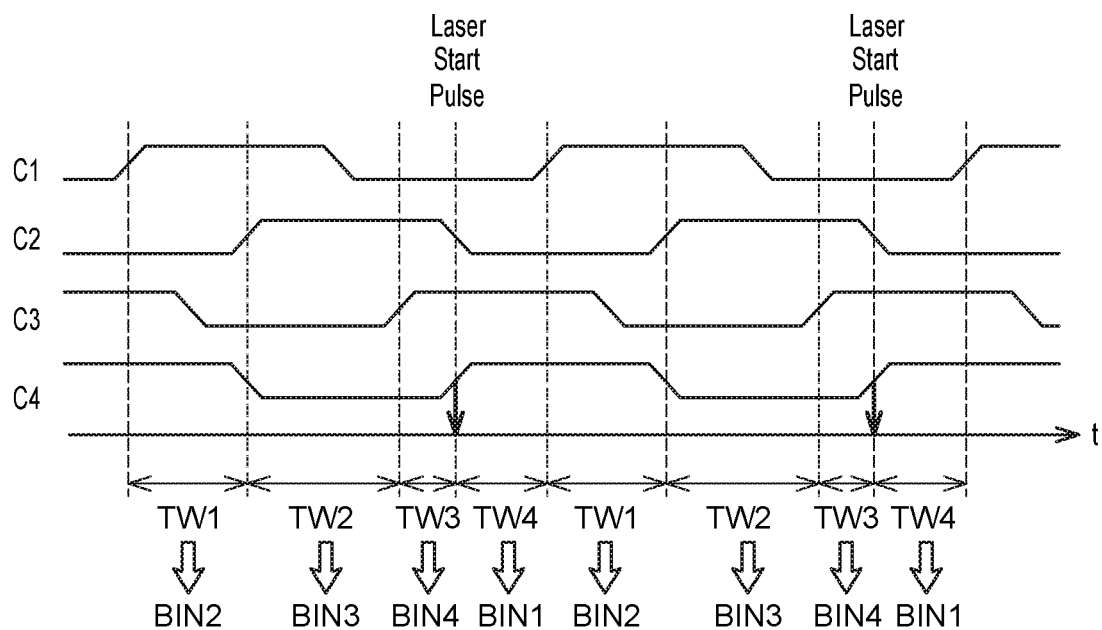

FIG. 8 shows, for example, yet another phase rotation setting where the phase rotator/selector 312 is configured to control an emission of a light pulse (Laser Start Pulse) at rising edges of the signal C4. The phase rotation multiplexer 310 is configured to couple:

the output GD1, corresponding to the time window TW1, to the ripple counter BIN2;
the output GD2, corresponding to the time window TW2, to the ripple counter BIN3;
the output GD3, corresponding to the time window TW3, to the ripple counter BIN4; and
the output GD4, corresponding to the time window TW4, to the ripple counter BIN1.

As shown above with reference to FIGS. 5 to 8, the phase rotator/selector 312 (FIG. 3) may be configured such that the selected ripple counters BIN1, BIN2, BIN3, BIN4 to which the phase rotation multiplexer 310 dispatches the outputs GD1, GD2, GD3, GD4 of the gated edge detector decoder 308 vary over time, for example according to a cyclic circular shift, in other words a rotation. Furthermore, an opposite phase rotation is applied to the light source, such that there is not a modification of relative timing between the light signal and the bins.

In the example of FIGS. 5 to 8, the width of each time window TW1, TW2, TW3, TW4 does not change over time, that is, from one phase rotation setting to the other.

After a whole cycle comprising all four of the above-described rotation settings, the discrepancies between the phase-shifted clock signals C1, C2, C3 and C4 are considered to be averaged out.

Figure 9:
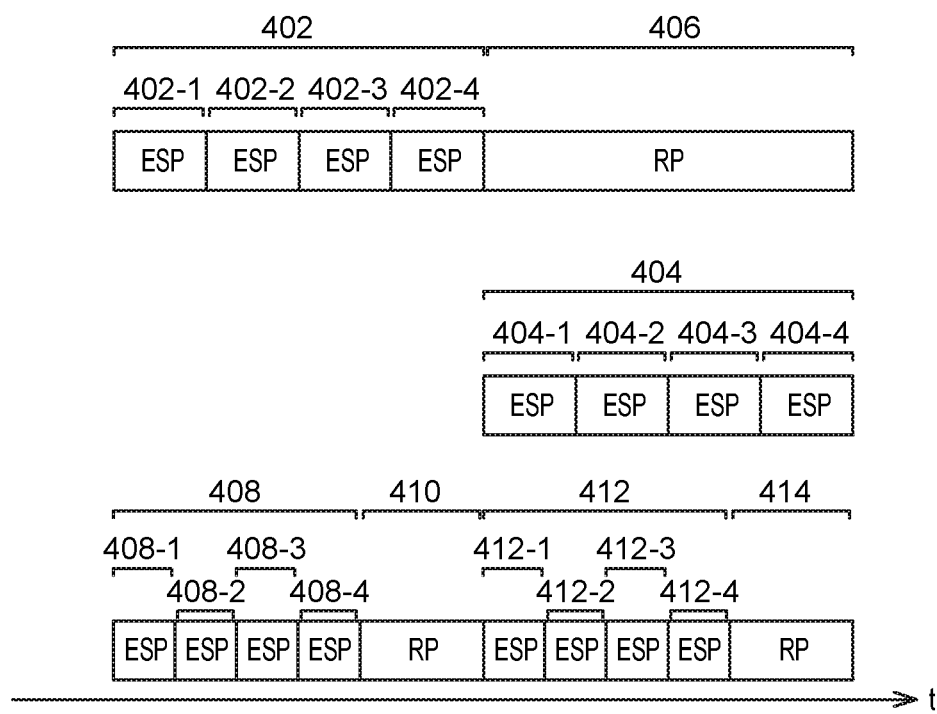
FIG. 9 is a timing diagram representing the operation of the depth map sensor of FIG. 1 according to an example embodiment.

FIG. 9 is a timing diagram representing the operation of the depth map sensor 100 of FIG. 1 according to an example embodiment.

During operation of the depth map sensor 100 of FIG. 1, the clusters 204 of pixels 202 (see FIG. 2) of the return array 102 are for example illuminated sequentially. The clusters 204 of the return array 102 are for example activated to detect illumination from the image scene in sequence from top to bottom as they are illuminated during the scanning operation.

According to one embodiment, the sequential activation of the clusters 204 (204-1 and 204-2) is performed in synchronization with the illumination of corresponding or associated light sources 106 (106-1 and 106-2) of the illumination system 104 of FIG. 1. According to this embodiment, the number of clusters 204 is equal to the number N of light sources 106, where N is equal to two or more. In other words, each light source 106 of the illumination system 104 is configured to illuminate a corresponding cluster 204 of the return array 102.

In the following disclosure, the time period during which a cluster 204 of the return array 102 is illuminated is termed "exposure phase". Given that the illumination system 104 is assumed to comprise N light sources 106, there are also N exposure phases of the return array 102. In particular, as depicted in FIG. 9, one exposure phase 402 of the return array 102 is defined by the cluster 204-1 being illuminated using the light source 106-1 and another exposure phase 404 of the return array 102 is defined by the cluster 204-2 being illuminated using the light source 106-2.

In the following disclosure, the time period during which the pixels 202 of a cluster 204 are read after being illuminated is termed "readout phase". Given that there are N exposure phases, there are also N readout phases of the return array 102. In particular, as depicted in FIG. 9, one readout phase (RP) 406 is defined by reading the pixels 202-1 of the cluster 204-1 following the exposure phase 402.

In some embodiments, one of the two reference arrays 108-1, 108-2, for example the top reference array 108-1, is also illuminated then read during each exposure phase of a cluster 204 of the return array 102.

More specifically, as depicted in FIG. 9, an exposure phase 408 of the reference array 108-1, followed by a readout phase (RP) 410 of the reference array 108-1, takes place during the exposure phase 402 of the cluster 204-1 and another exposure phase 412 of the reference array 108-1, followed by a readout phase (RP) 414 of the reference array 108-1, takes place during the exposure phase 404 of the cluster 204-2.

The reference array 108-1 is thus both exposed and read during each exposure phase of a cluster 204 of the return array 102. Compared for example to a situation where the exposure phases 408, 412 of the reference array 108-1 would respectively last as long as the exposure phases 402, 404 of the return array 108-1, this advantageously avoids the need for memory elements configured to store information captured by the reference array 108-1. A drawback of such memory elements is that they would require a large amount of implementation physical space, thus leading to a reduced resolution or to a bigger size of the depth map sensor 100.

Furthermore, according to one embodiment, each exposure phase 402, 404 of the return array 102 and each exposure phase 408, 412 of the reference array 108-1 is split into a plurality of exposure sub-phases (ESP), for example four exposure sub-phases. As shown in FIG. 9, the exposure 402 of the cluster 204-1 of the return array 102 comprises four exposure sub-phases 402-1, 402-2, 402-3 and 402-4, the exposure 404 of the cluster 204-2 of the return array 102 comprises four exposure sub-phases 404-1, 404-2, 404-3 and 404-4, the exposure 408 of the reference array 108-1 comprises four exposure sub-phases 408-1, 408-2, 408-3 and 408-4, and the exposure 412 of the reference array 108-1 comprises four exposure sub-phases 412-1, 412-2, 412-3 and 412-4.

As depicted in FIG. 9, the exposure sub-phases of the reference array 108-1 are shorter than the exposure sub-phases of the return array 102 to allow for the readout phase RP of the reference array 108-1. For example, the duration of each exposure sub-phase 402-1, 402-2, 402-3, 402-4 of the return array 102 is between 10 µs and 20 µs, for example equal to 17.25 µs, whereas the duration of each exposure sub-phase 408-1, 408-2, 408-3 and 408-4 is between 50% and 95% of the duration of each exposure sub-phase 402-1, 402-2, 402-3, 402-4 of the return array 102.

According to one embodiment, each exposure sub-phase of a same exposure phase corresponds to a different phase rotation setting. The phase rotation settings are thus changed at a higher frequency during the exposure phases 408, 412 of the reference array 108-1 than during the exposure phases 402, 404 of the return array 102.

Therefore, such an operation of the depth map sensor 100 of FIG. 1 requires the pixel circuits 300 (FIG. 3) of the return array 102 and the pixel circuits 300 of the reference array 108-1 to be driven by two separate time sources. The use of two time sources instead of one is undesirable, particularly because time sources usually occupy a relatively large chip area and have relatively high energy consumption.

Figure 10:
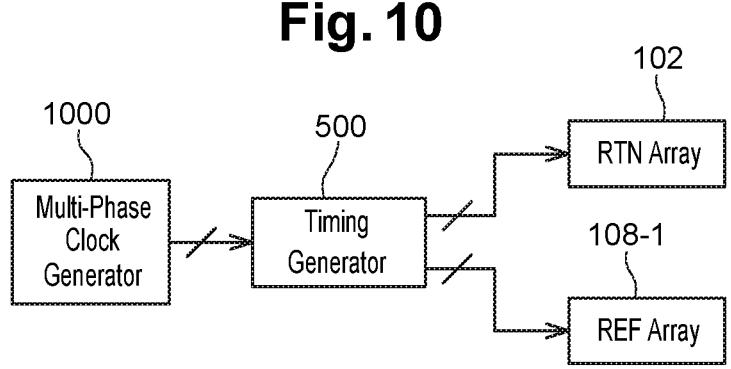
FIG. 10 schematically illustrates, in the form of blocks, part of a depth map sensor according to an example embodiment.

FIG. 10 schematically illustrates, in the form of blocks, part of a depth map sensor comprising a multi-phase clock generator (Multi-Phase Clock Generator) 1000 and a timing generator (Timing Generator) 500, associated with pixel arrays according to an example embodiment.

More specifically, as shown in FIG. 10, the timing generator 500 is for example coupled to the return array (RTN Array) 102 and to one reference array (REF Array), for example the upper reference array 108-1 (FIG. 1). In the case that there is more than one reference array, the timing generator 500 is for example coupled to each reference array.

The timing generator 500 is for example configured to generate, based on the signals generated by the multi-phase clock generator 1000, the phase-shifted clock signals that allow the depth map sensor 100 to be operated as described with relation to FIG. 9, and to provide these phase-shifted clock signals to each of the pixel arrays.

Figure 11:
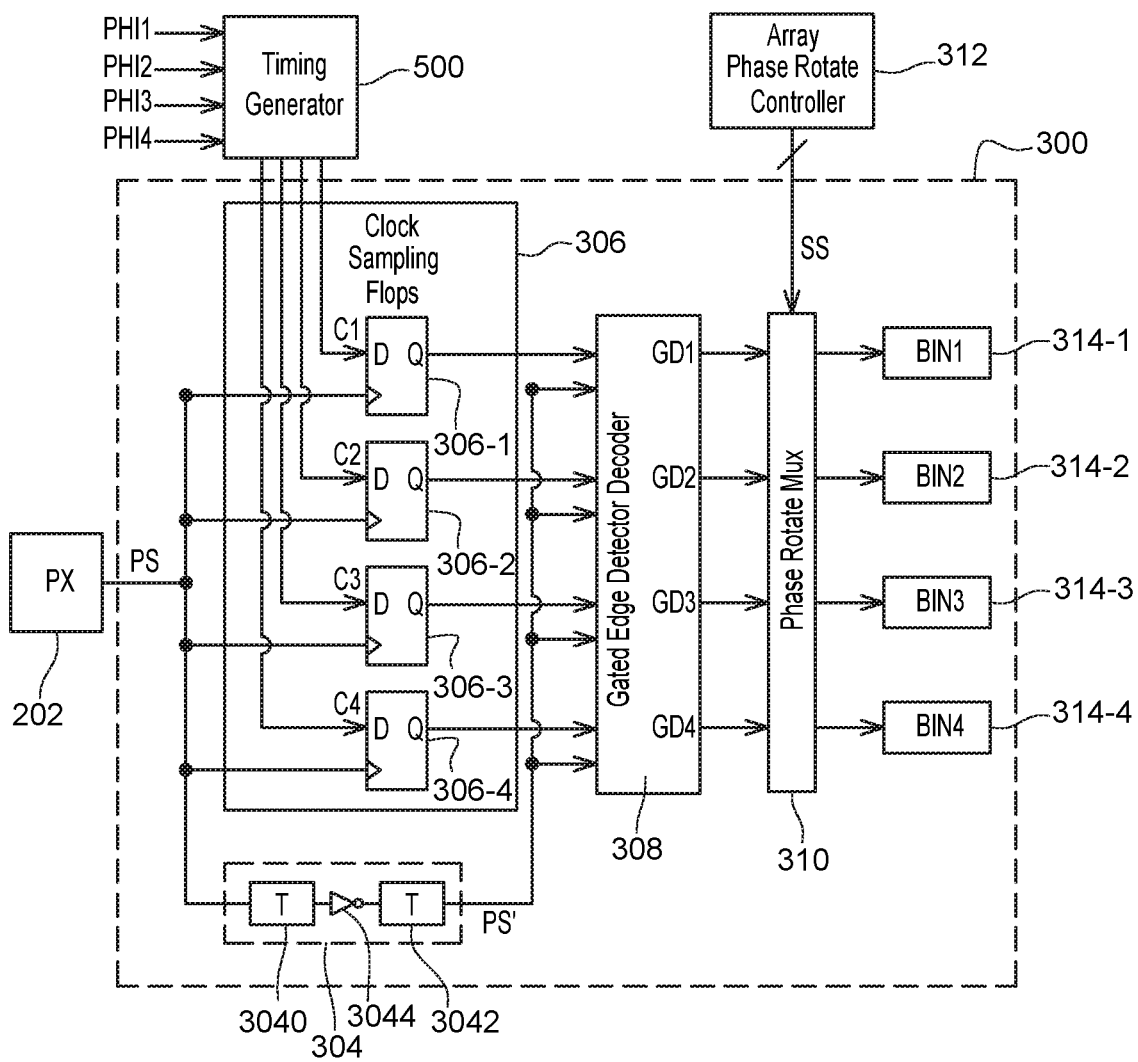
FIG. 11 schematically illustrates, in the form of blocks, the pixel circuit of FIG. 3 associated with the timing generator of FIG. 10 according to an example embodiment.

FIG. 11 schematically illustrates, in the form of blocks, the pixel circuit 300 of FIG. 3 associated with the timing generator 500 of FIG. 10 according to an example embodiment. In the description below, the pixel circuit 300 is considered to be a pixel circuit of the return array 102 (FIG. 1). However, the pixel circuit 300 could equally be a pixel circuit of one reference array, for example the upper reference array 108-1, as the pixel circuits of the reference array 108-1 are also associated with the same timing generator 500.

According to this embodiment, the timing generator 500 is coupled to the flip-flops 306 (306-1, 306-2, 306-3 and 306-4) of the pixel circuit 300. The timing generator 500 is, in particular, configured to provide the flip-flops 306 with the phase-shifted clock signals C1, C2, C3 and C4. As shown in FIG. 11, the timing generator 500 for example receives four further phase-shifted clock signals PHI1, PHI2, PHI3 and PHI4 from the multi-phase clock generator 1000 (not illustrated in FIG. 11).

Figure 12:
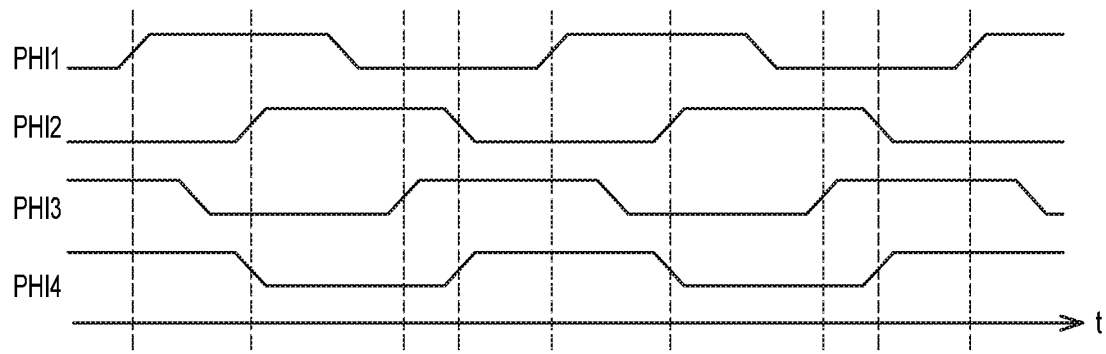
FIG. 12 is a timing diagram of phase-shifted clock signals received by the timing generator of FIG. 11.

FIG. 12 is a timing diagram of the phase-shifted clock signals PHI1, PHI2, PHI3 and PHI4 received by the timing generator 500 of FIG. 11. In particular, FIG. 12 corresponds to an example in which the phase-shifted clock signals PHI1, PHI2, PHI3 and PHI4 are not separated by equal phase shifts. Such a discrepancy is for example caused by the physical implementation of circuits and conduction paths (not shown) configured to propagate the signals PHI1, PHI2, PHI3 and PHI4 from a timing source to the pixel circuit.

More specifically, in the example of FIG. 12:
the phase shift between the signals PHI1 and PHI2 is equal to the phase shift between the signals PHI4 and PHI1;
the phase shift between the signals PHI2 and PHI3 is larger than the phase shift between the signals PHI1 and PHI2; and
the phase shift between the signals PHI3 and PHI4 is smaller than the phase shift between the signals PHI1 and PHI2.

According to one embodiment, the timing generator 500 provides the D-type flip-flops 306-1, 306-2, 306-3 and 306-4 of the pixel circuit 300 with phase-shifted clock signals C1, C2, C3 and C4 each corresponding to one of the signals PHI1, PHI2, PHI3, PHI4. In order to mitigate the impacts of possible discrepancies between the phase-shifted clock signals PHI1, PHI2, PHI3 and PHI4 such as those shown in FIG. 12, the timing generator 500 is further configured such that these signals PHI, PHI2, PHI3 and PHI4 are dispatched to the D-type flip-flops 306-1, 306-2, 306-3 and 306-4 according to a cyclic circular shift. In other words, the timing generator 500 is configured to perform a phase rotation of the phase-shifted clock signals PHI1, PHI2, PHI3 and PHI4.

The phase rotation multiplexer 310, controlled by the signal transmitted by the phase rotator/selector 312, is for example configured to dispatch SPAD events detected within the time windows TW1, TW2, TW3 and TW4 to the ripple counters BIN1, BIN2, BIN3 and BIN4, respectively.

An example of the phase rotation performed by the timing generator 500 is described below in relation with FIGS. 13 to 16.

FIGS. 13 to 16 are further timing diagrams representing signals in the pixel circuit 300 of FIG. 3 according to an example embodiment.

According to one embodiment, laser light pulses (Laser Start Pulse), symbolized by vertical arrows in FIGS. 13 to 16, are emitted by a laser source based on the rising edges of the same signal. For example, in the four phase rotation settings described below in relation with FIGS. 13 to 16, the light pulses are emitted based on the rising edges of the signal PHI1. In FIGS. 13 to 16, the laser start pulses and the rising edges of the signal PHI are shown to occur at the same time. However, in practice, there may be a time offset between the rising edges of the signal PHI and the laser start pulses.

As shown below with reference to FIGS. 13 to 16, the phase rotator/selector 312 (FIG. 11) is for example configured such that the selection by the phase rotation multiplexer 310 of the output GD1, GD2, GD3, GD4 of the gated edge detector decoder 308 transmitted to each ripple counter BIN1, BIN2, BIN3, BIN4 changes over time according to a cyclic circular shift, or rotation. The rotation performed by the phase rotation multiplexer 310 is such that there is not a modification of relative timing between the light signal and the bins.

Figure 13:
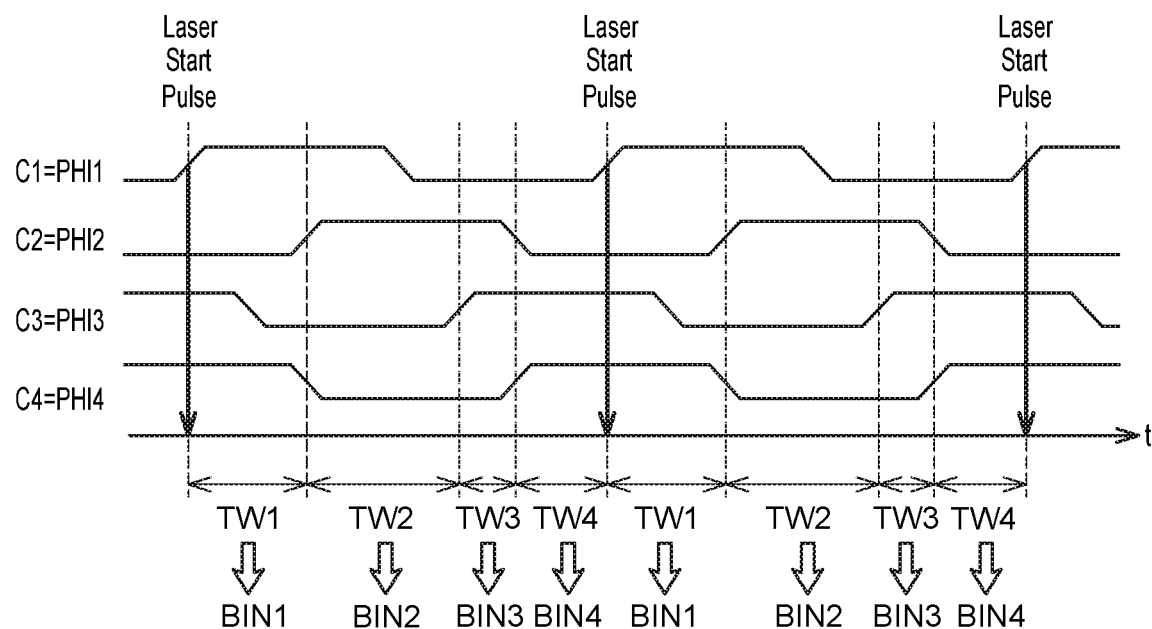
FIGS. 13 to 16 are further timing diagrams representing signals in the pixel circuit of FIG. 3 according to an example embodiment.

FIG. 13 shows, for example, a first phase rotation setting where the phase-shifted clock signals C1, C2, C3 and C4 correspond to the phase-shifted clock signals PHI1, PHI2, PHI3 and PHI4, respectively.

In the example of FIG. 13, the phase rotation multiplexer is configured to couple:
the output GD1, corresponding to the time window TW1, to the ripple counter BIN1;
the output GD2, corresponding to the time window TW2, to the ripple counter BIN2;
the output GD3, corresponding to the time window TW3, to the ripple counter BIN3; and
the output GD4, corresponding to the time window TW4, to the ripple counter BIN4.

Figure 14:
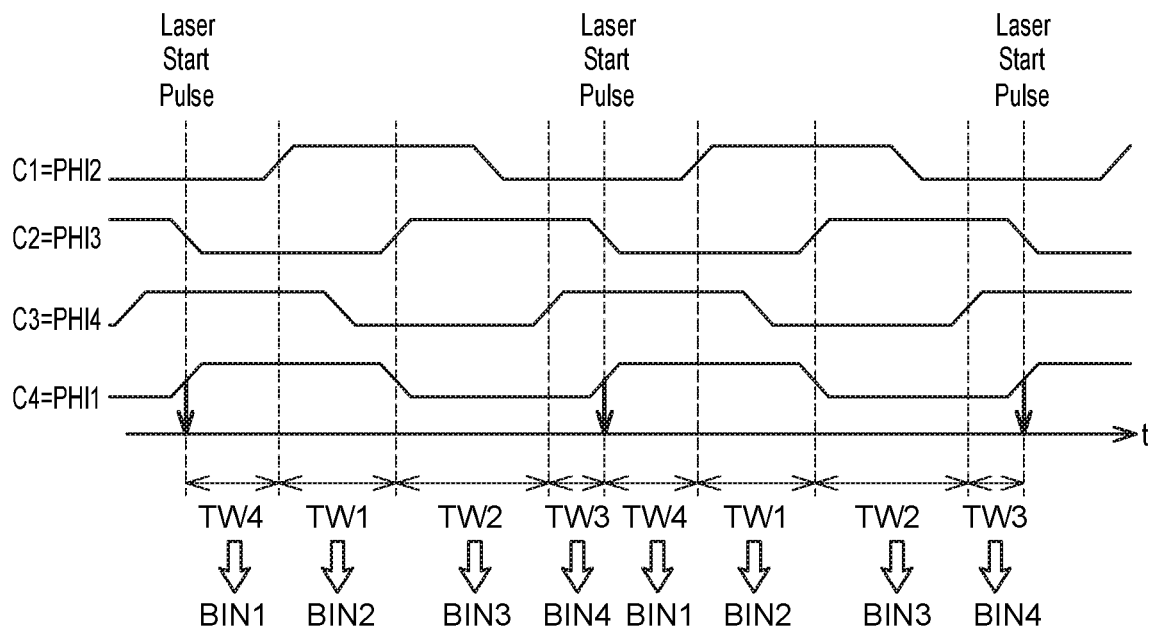

FIG. 14 shows, for example, a second phase rotation setting where the phase-shifted clock signals C1, C2, C3 and C4 correspond to the phase-shifted clock signals PHI2, PHI3, PHI4 and PHI, respectively.

The time window TW1, which is for example defined, as described above with reference to FIG. 4, by the time interval between a rising edge of the signal C1 and a rising edge of the signal C2, corresponds to the time interval between a rising edge of the signal PHI1 and a rising edge of the signal PHI2 in the first phase rotation setting illustrated in FIG. 13 and to the time interval between a rising edge of the signal PHI2 and a rising edge of the signal PHI3 in the second phase rotation setting illustrated in FIG. 14.

In the example of FIG. 14, the phase rotation multiplexer is configured to couple:
the output GD1, corresponding to the time window TW1, to the ripple counter BIN2;
the output GD2, corresponding to the time window TW2, to the ripple counter BIN3;
the output GD3, corresponding to the time window TW3, to the ripple counter BIN4; and
the output GD4, corresponding to the time window TW4, to the ripple counter BIN1.

Figure 15:
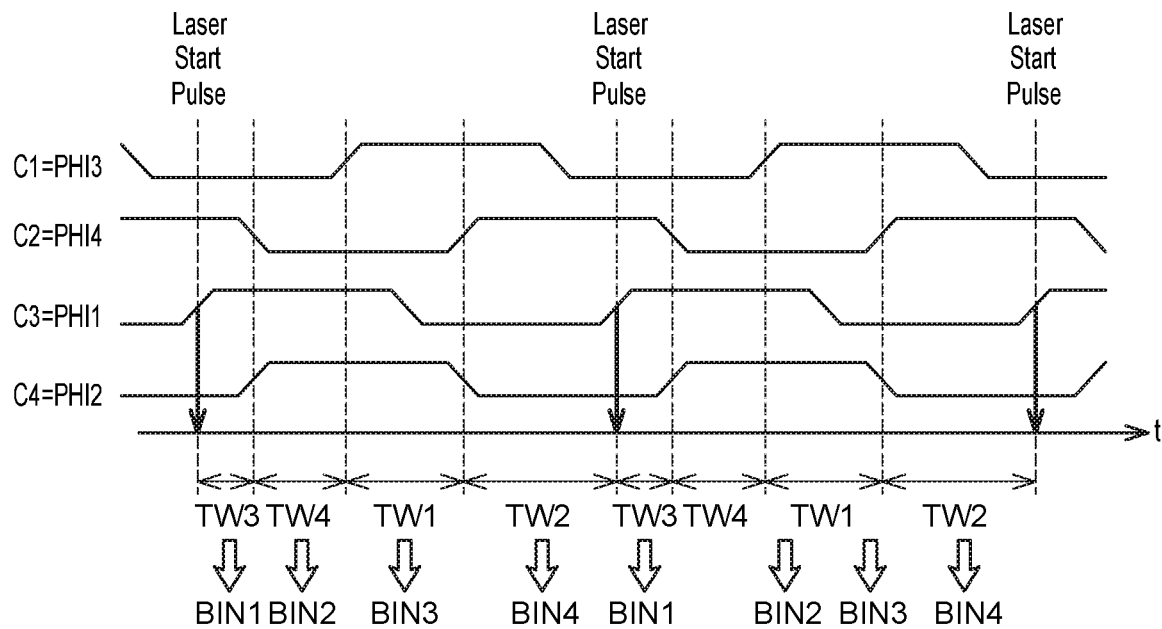

FIG. 15 shows, for example, a further rotation to a third phase rotation setting where the phase-shifted clock signals C1, C2, C3 and C4 correspond to the phase-shifted clock signals PHI3, PHI4, PHI1 and PHI2, respectively.

In the example of FIG. 15, the phase rotation multiplexer is configured to couple:
the output GD1, corresponding to the time window TW1, to the ripple counter BIN3;
the output GD2, corresponding to the time window TW2, to the ripple counter BIN4;
the output GD3, corresponding to the time window TW3, to the ripple counter BIN1; and
the output GD4, corresponding to the time window TW4, to the ripple counter BIN2.

Figure 16:
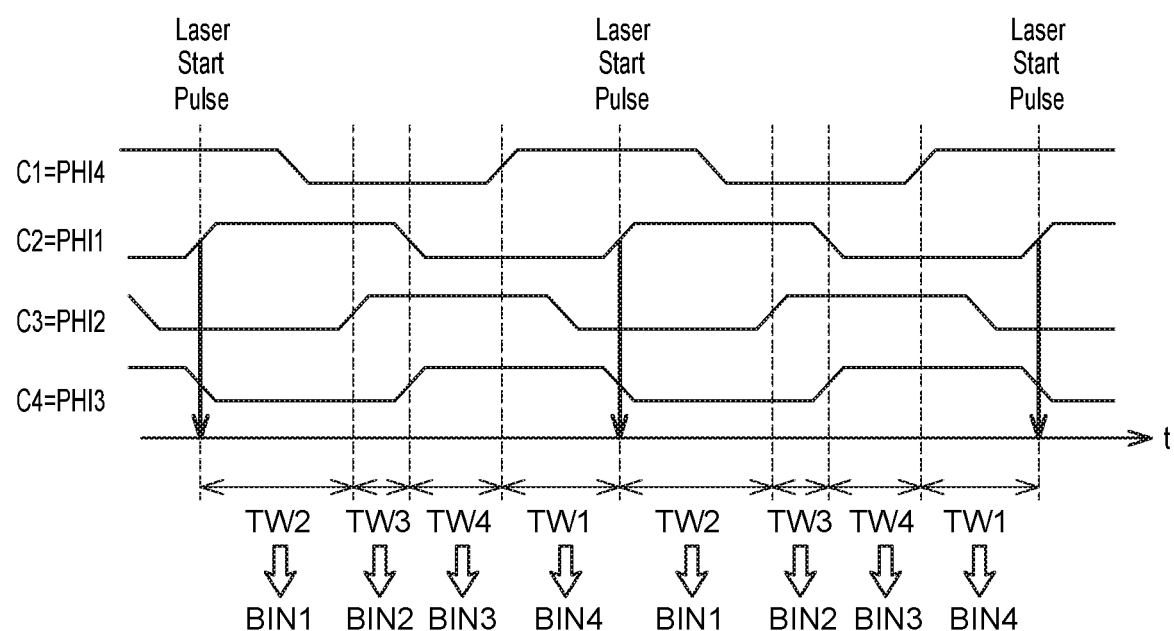

FIG. 16 shows, for example, a further rotation to a fourth phase rotation setting where the phase-shifted clock signals C1, C2, C3 and C4 correspond to the phase-shifted clock signals PHI4, PHI, PHI2 and PHI3, respectively.

In the example of FIG. 16, the phase rotation multiplexer is configured to couple:
the output GD1, corresponding to the time window TW1, to the ripple counter BIN4;
the output GD2, corresponding to the time window TW2, to the ripple counter BIN1;
the output GD3, corresponding to the time window TW3, to the ripple counter BIN2; and
the output GD4, corresponding to the time window TW4, to the ripple counter BIN3.

The four rotation settings described above in relation with FIGS. 13 to 16 each correspond to a different configuration of phase-shifted clock signals C1, C2, C3 and C4. For example, these four rotation settings each correspond to one of the four exposure sub-phases (ESP) of a same exposure phase as described above in relation with FIG. 9.

Figure 17:
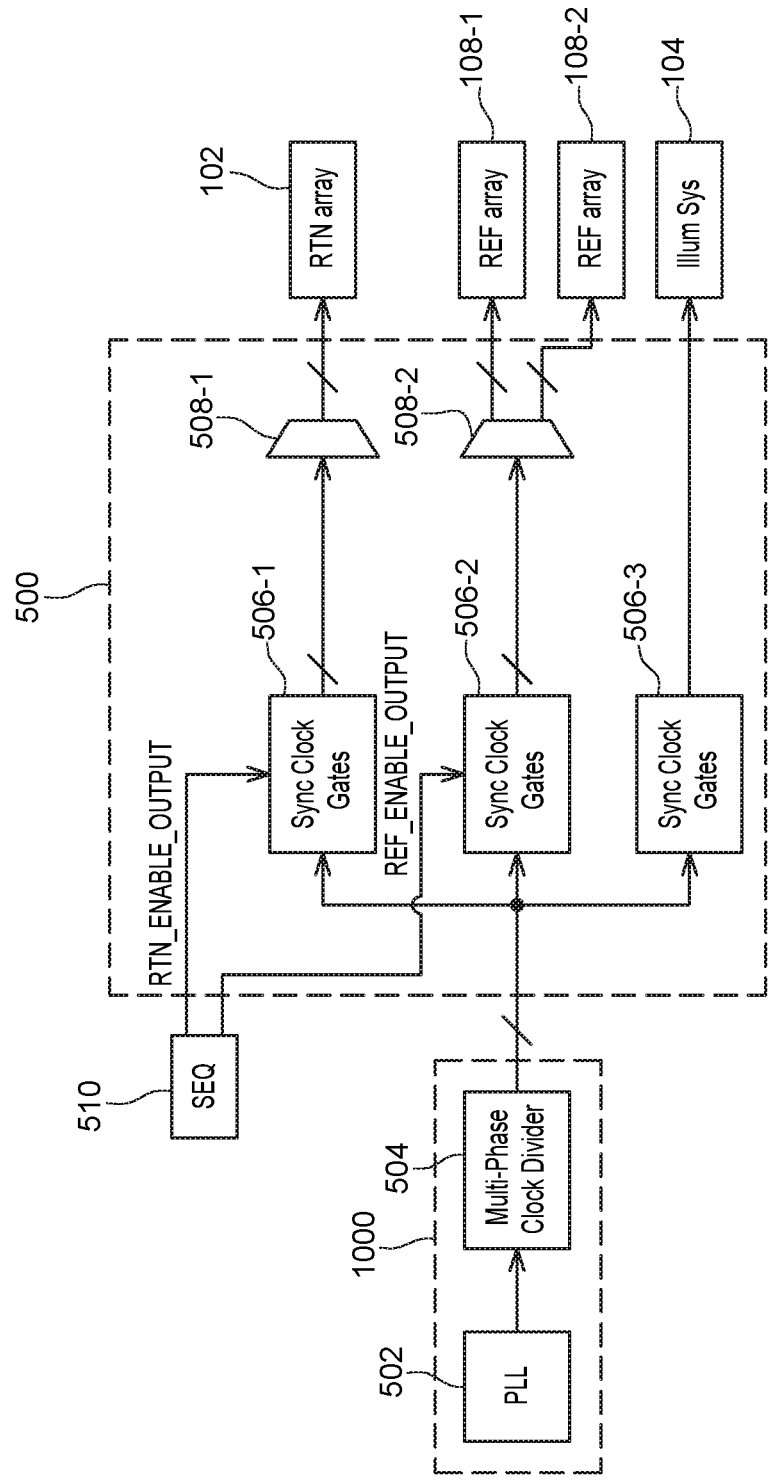
FIG. 17 schematically illustrates, in the form of blocks, a timing generator of the depth map sensor of FIG. 1 according to an example embodiment.

FIG. 17 schematically illustrates, in the form of blocks, the timing generator 500 and the multi-phase clock generator 1000 of the depth map sensor 100 of FIG. 1 according to an example embodiment.

As shown in FIG. 17, the multi-phase clock generator 1000 for example comprises a phase-locked loop (PLL) 502. The phase-locked loop 502 for example acts as a clock generator, by multiplying a lower-frequency reference clock (not shown in FIG. 17) up to the operating frequency of the depth map sensor 100 (FIG. 1).

The output signal of the phase-locked loop 502, which is for example a single clock signal, is provided to a multi-phase clock divider (Multi-Phase Clock Divider) 504 of the multi-phase clock generator 1000. The multi-phase clock divider 504 is for example configured to generate four phase-shifted clock signals.

According to one embodiment, the multi-clock phase divider 504 generates the four phase-shifted clock signals PHI1, PHI2, PHI3 and PHI4 of FIG. 12. The four phase-shifted clock signals PHI1, PHI2, PHI3 and PHI4 are then provided to three blocks (Sync Clock Gates) 506 of the timing generator 500.

More specifically, as shown in FIG. 17, a block 506-1 is, for example, configured to propagate the signals PHI1, PHI2, PHI3 and PHI4 to a multiplexing circuit 508-1 coupled to the return array (RTN array) 102. A further block 506-2 is, for example, configured to propagate the signals PHI1, PHI2, PHI3 and PHI4 to a further multiplexing circuit 508-2 coupled to the reference arrays (REF array) 108-1 and 108-2. Yet a further block 506-3 is, for example, configured to propagate one of the signals PHI1, PHI2, PHI3 and PHI4 to the illumination system (Illum Sys) 104.

According to one embodiment, the propagation of the signals PHI1, PHI2, PHI3 and PHI4 to the multiplexing circuit 508-1 is for example gated by the block 506-1 using an enable signal, denoted herein RTN_ENABLE_OUTPUT. Similarly, the propagation of the signals PHI1, PHI2, PHI3 and PHI4 to the multiplexing circuit 508-2 is for example gated by the block 506-2 using a further enable signal, denoted herein REF_ENABLE_OUTPUT. According to one embodiment, the enable signals RTN_ENABLE_OUTPUT and REF_ENABLE_OUTPUT are each two-state binary signals, and are for example generated by a sequencer 510. The sequencer 510 is, for example, a state machine.

The enable signal RTN_ENABLE_OUTPUT, provided by the sequencer 510 to the block 506-1, advantageously allows interruption of the propagation of the phase-shifted clock signals PHI1, PHI2, PHI3 and PHI4 to the multiplexing circuit 508-1. This for example enables the multiplexing circuit 508-1 to switch from one phase rotation setting to another during periods when the phase-shifted clock signals are not propagated to the multiplexing circuit 508-1. This for example prevents glitches when switching from one phase rotation setting of the return array 102 to the next. All these advantages similarly apply to the reference arrays 108-1, 108-2.

Moreover, the presence of two enable signals RTN_ENABLE_OUTPUT and REF_ENABLE_OUTPUT advantageously allows to independently perform phase rotation on the return array 102 and on the reference array 108-1. This for example enables the reference array 108-1 to perform phase rotation at a higher rate than the return array 102, thus leading to shorter exposure sub-phases for the reference array 108-1 than for the return array 102, as shown with reference to FIG. 9.

Figure 18:
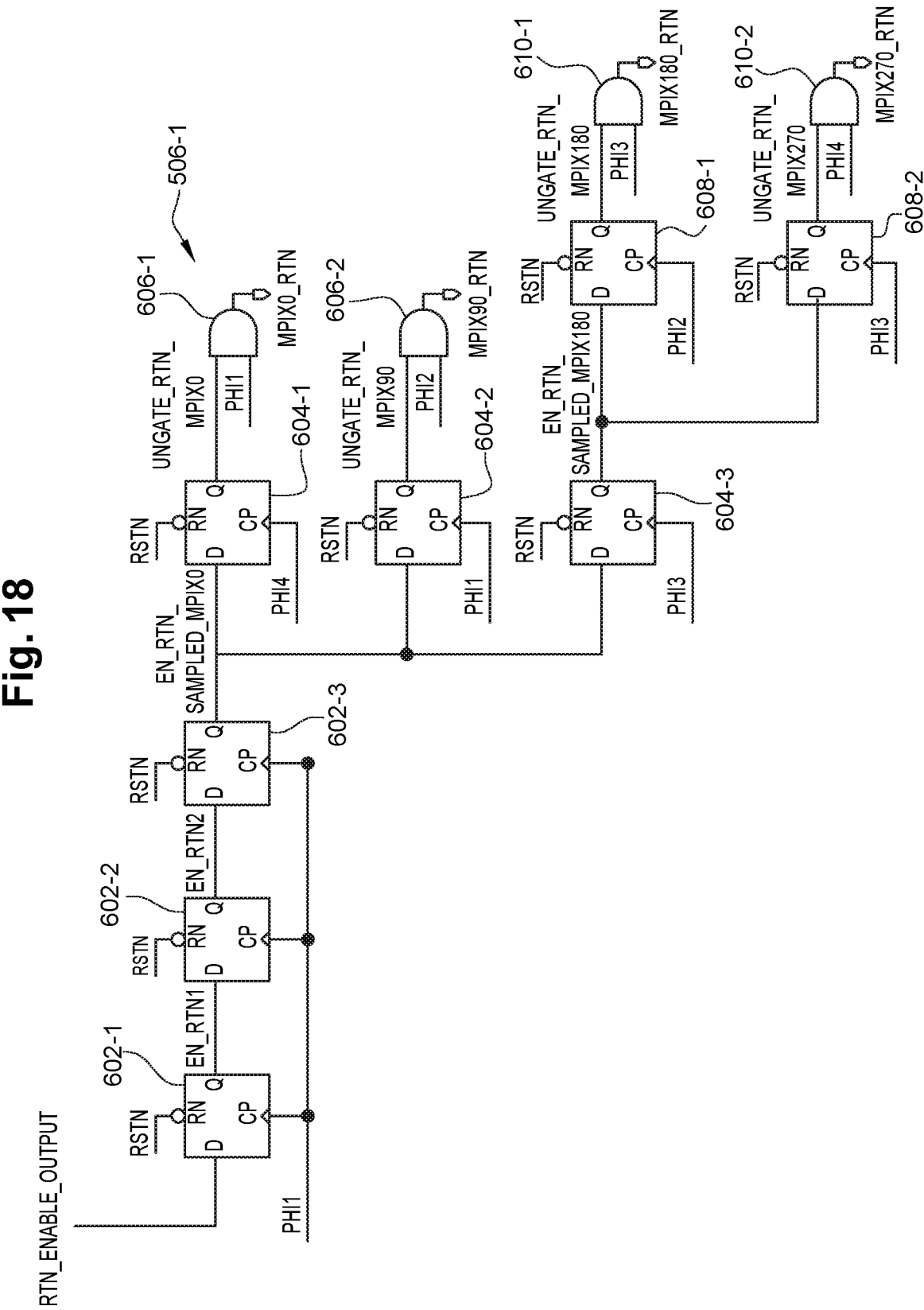
FIG. 18 schematically illustrates a circuit configured to generate phase-shifted signals according to an example embodiment.

FIG. 18 schematically illustrates a circuit configured to generate phase-shifted signals according to an example embodiment. In particular, FIG. 18 depicts the block 506-1 coupled with the return array 102 according to an example embodiment. However, the following description may equally apply to the block 506-2 coupled with the reference arrays 108-1 and 108-2.

According to one embodiment, the block 506-1 comprises three flip-flops 602-1, 602-2 and 602-3 coupled in series. The flip-flops 602-1, 602-2 and 602-3 all receive, on their clock input (CP), the signal PHI1. The flip-flop 602-1 receives the enable signal RTN_ENABLE_OUTPUT on its data input (D) and provides a signal denoted EN_RTN1 on its output (Q).

The output of the flip-flop 602-1 is coupled to the data input (D) of the flip-flop 602-2. Thus, the flip-flop 602-2 receives the EN_RTN1 signal on its data input. The flip-flop 602-2 provides a further signal denoted EN_RTN2 on its output (Q).

The output of the flip-flop 602-2 is coupled to the data input (D) of the flip-flop 602-3. Thus, the flip-flop 602-3 receives the EN_RTN2 signal on its data input. The flip-flop 602-3 provides yet a further signal herein denoted EN_RTN_SAMPLED_MPIX0 on its output (Q).

The flip-flops 602-1, 602-2 and 602-3 for example are used to synchronize the enable signal RTN_ENABLE_OUTPUT with the clock signal PHI1, and thereby prevent metastability.

The output of the flip-flop 602-3, providing the signal EN_RTN_SAMPLED_MPIX0, is coupled to the data inputs (D) of three further flip-flops 604-1, 604-2 and 604-3. The clock inputs (CP) of the flip-flops 604-1, 604-2 and 604-3 receive the phase-shifted clock signals PHI4, PHI and PHI3, respectively.

The output (Q) of the flip-flop 604-1 is coupled to an input of an AND gate 606-1, and provides a signal UNGATE_RTN_MPIX0 to the AND gate 606-1. In a similar way, the output (Q) of the flip-flop 604-2 is coupled to an input of a further AND gate 606-2, and provides a further signal UNGATE_RTN_MPIX90 to the AND gate 606-2.

The AND gate 606-1 is further provided with the signal PHI1 and outputs a signal denoted herein MPIX0_RTN. Similarly, the AND gate 606-2 is furthermore provided with the signal PHI2 and outputs a further signal denoted herein MPIX90_RTN.

The flip-flop 604-3 provides yet a further signal herein denoted EN_RTN_SAMPLED_MPIX180 on its output (Q).

The output of the flip-flop 604-3 is coupled to the data input (D) of two further flip-flops 608-1 and 608-2. Thus, the signal EN_RTN_SAMPLED_MPIX180 is provided to the data inputs of the flip-flops 608-1 and 608-2. The signals PHI2 and PHI3 are provided to the clock inputs (CP) of the flip-flops 608-1 and 608-2, respectively.

The output (Q) of the flip-flop 608-1 is coupled to an input of an AND gate 610-1, and provides a signal UNGATE_RTN_MPIX180 to the AND gate 610-1. In a similar way, the output (Q) of the flip-flop 608-2 is coupled to an input of a further AND gate 610-2, and provides a further signal UNGATE_RTN_MPIX270 to the AND gate 610-2.

The AND gate 610-1 is furthermore provided with the signal PHI3 and outputs a signal denoted herein MPIX180_RTN. Similarly, the AND gate 610-2 is furthermore provided with the signal PHI4 and outputs a further signal denoted herein MPIX270_RTN.

As depicted in FIG. 18, the flip-flops 602-1, 602-2, 602-3, 604-1, 604-2, 604-3, 608-1 and 608-2 for example each receive a signal, denoted herein RSTN, on their reset input (RN).

Figure 19:
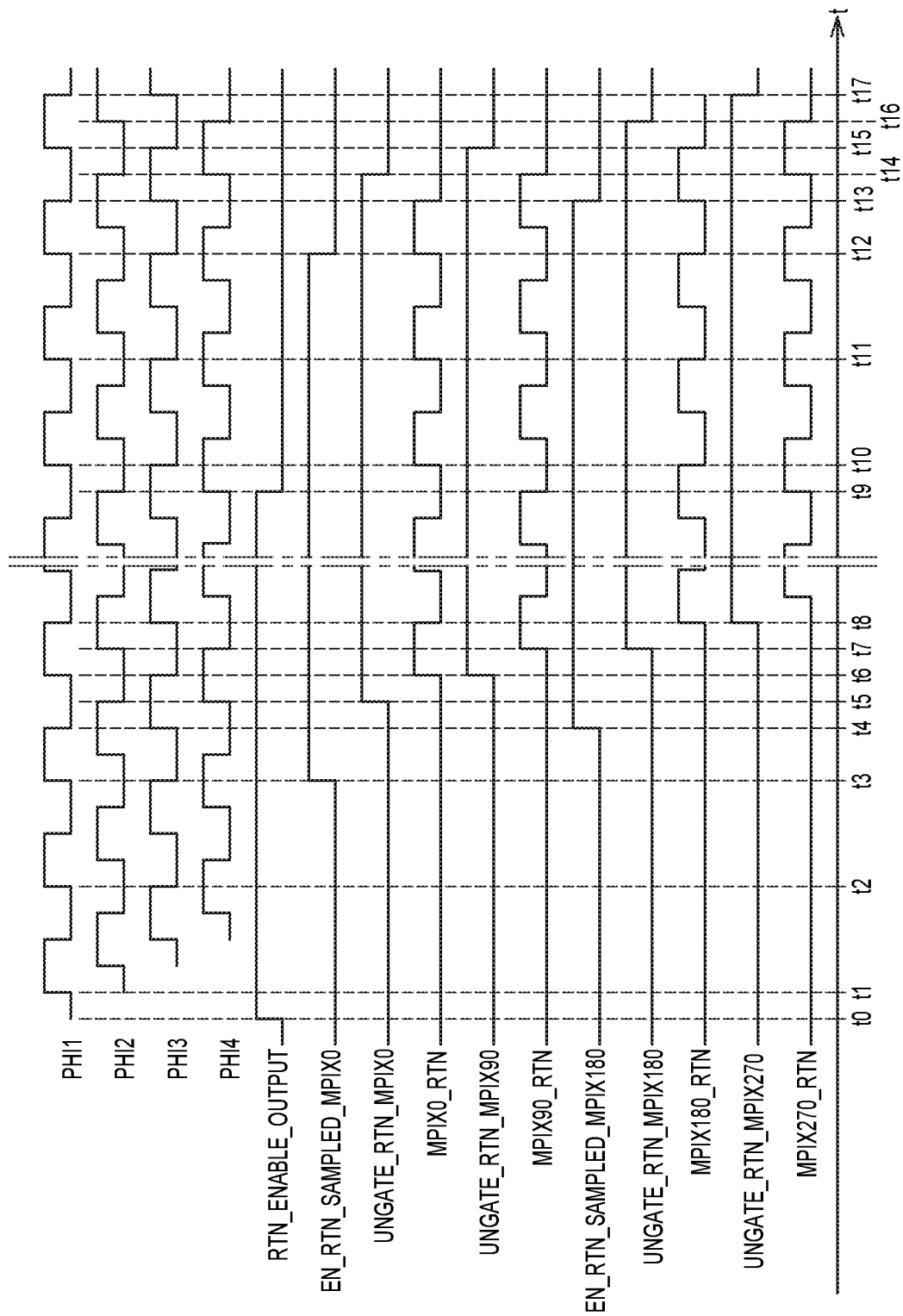
FIG. 19 is a timing diagram representing the operation of the circuit of FIG. 18 according to an example embodiment.

FIG. 19 is a timing diagram representing the operation of the circuit 506-1 of FIG. 18 according to an example embodiment.

The signals PHI1, PHI2, PHI3 and PHI4 are for example rectangular-shaped periodic signals, which all approximately have the same period. Furthermore, the signals PHI1 to PHI4 are phase-shifted with respect to each other such that the signals PHI2, PHI3 and PHI4 respectively exhibit phase-shifts of 90°, 180° and 270° compared to the signal PHI1.

At a time t0, the signal PHI1 is at a low level. At the time t0, the enable signal RTN_ENABLE_OUTPUT is for example set by the sequencer 510 to a high level.

At a time t1, when the signal PHI1 rises for the first time after the time t0, the signal EN_RTN1 (not shown) is set to a high level by the flip-flop 602-1 (FIG. 18).

At a time t2, when the signal PHI1 rises for the second time after the time t0, the signal EN_RTN2 (not shown) is set to a high level by the flip-flop 602-2.

At a time t3, when the signal PHI1 rises for the third time after the time t0, the signal EN_RTN_SAMPLED_MPIX0 is set to a high level by the flip-flop 602-3.

At a time t4, when the signal PHI3 rises for the first time after the time t3, the signal EN_RTN_SAMPLED_MPIX180 is set to a high level by the flip-flop 604-3.

At a time t5, when the signal PHI4 rises for the first time after the time t3, the signal UNGATE_RTN_MPIX0 is set to a high level by the flip-flop 604-1.

Starting from the time t5, the signal PHI1 is temporarily propagated by the output of the AND gate 606-1. As from the time t5, the signal MPIX0_RTN for example exhibits the same shape as the signal PHI1.

At a time t6, when the signal PHI1 rises for the first time after the time t3, the signal UNGATE_RTN_MPIX90 is set to a high level by the flip-flop 604-2.

Starting from the time t6, the signal PHI2 is temporarily propagated by the output of the AND gate 606-2. As from the time t6, the signal MPIX90_RTN for example exhibits the same shape as the signal PHI2. In other words, the signal MPIX90_RTN is phase-shifted by approximately 90° with respect to the signal MPIX0_RTN.

At a time t7, when the signal PHI2 rises for the first time after the time t4, the signal UNGATE_RTN_MPIX180 is set to a high level by the flip-flop 608-1.

Starting from the time t7, the signal PHI3 is temporarily propagated by the output of the AND gate 610-1. As from the time t7, the signal MPIX180_RTN for example exhibits the same shape as the signal PHI3. In other words, the signal MPIX180_RTN is phase-shifted by approximately 180° with respect to the signal MPIX0_RTN.

At a time t8, when the signal PHI3 rises for the first time after the time t4, the signal UNGATE_RTN_MPIX270 is set to a high level by the flip-flop 608-2.

Starting from the time t8, the signal PHI4 is temporarily propagated by the output of the AND gate 610-2. As from the time t8, the signal MPIX270_RTN for example exhibits the same shape as the signal PHI4. In other words, the signal MPIX270_RTN is phase-shifted by approximately 270° with respect to the signal MPIX0_RTN.

At a time t9, the signal PHI1 is at a low level. At the time t9, the enable signal RTN_ENABLE_OUTPUT is for example set to a low level by the sequencer 510.

At a time t10, when the signal PHI1 rises for the first time after the time t9, the signal EN_RTN1 (not shown) is set to a low level by the flip-flop 602-1 (FIG. 18).

At a time t11, when the signal PHI1 rises for the second time after the time t9, the signal EN_RTN2 (not shown) is set to a low level by the flip-flop 602-2.

At a time t12, when the signal PHI1 rises for the third time after the time t9, the signal EN_RTN_SAMPLED_MPIX0 is set to a low level by the flip-flop 602-3.

At a time t13, when the signal PHI3 rises for the first time after the time t12, the signal EN_RTN_SAMPLED_MPIX180 is set to a low level by the flip-flop 604-3.

At a time t14, when the signal PHI4 rises for the first time after the time t12, the signal UNGATE_RTN_MPIX0 is set to a low level by the flip-flop 604-1.

Starting from the time t14, the signal PHI1 is no longer propagated by the output of the AND gate 606-1. As from the time t14, the signal MPIX0_RTN is set to a low level.

At a time t15, when the signal PHI1 rises for the first time after the time t12, the signal UNGATE_RTN_MPIX90 is set to a low level by the flip-flop 604-2.

Starting from the time t15, the signal PHI2 is no longer propagated by the output of the AND gate 606-2. As from the time t15, the signal MPIX90_RTN is set to a low level.

At a time t16, when the signal PHI2 rises for the first time after the time t13, the signal UNGATE_RTN_MPIX180 is set to a low level by the flip-flop 608-1.

Starting from the time t16, the signal PHI3 is no longer propagated by the output of the AND gate 610-1. As from the time t16, the signal MPIX180_RTN is set to a low level.

At a time t17, when the signal PHI3 rises for the first time after the time t13, the signal UNGATE_RTN_MPIX270 is set to a low level by the flip-flop 608-2.

Starting from the time t17, the signal PHI4 is no longer propagated by the output of the AND gate 610-2. As from the time t17, the signal MPIX270_RTN is set at a low level.

As shown above with reference to FIG. 19, the circuit 506-1 of FIG. 18 is configured to generate, using the enable signal RTN_ENABLE_OUTPUT and the four phase-shifted clock signals PHI, PHI2, PHI3 and PHI4, four further phase-shifted clock signals MPIX0_RTN, MPIX90_RTN, MPIX180_RTN and MPIX270_RTN. Furthermore, the phase-shifted clock signals MPIX0_RTN, MPIX90_RTN, MPIX180_RTN and MPIX270_RTN generated by the circuit 506-1 are interrupted using the enable signal RTN_ENABLE_OUTPUT.

Figure 20:
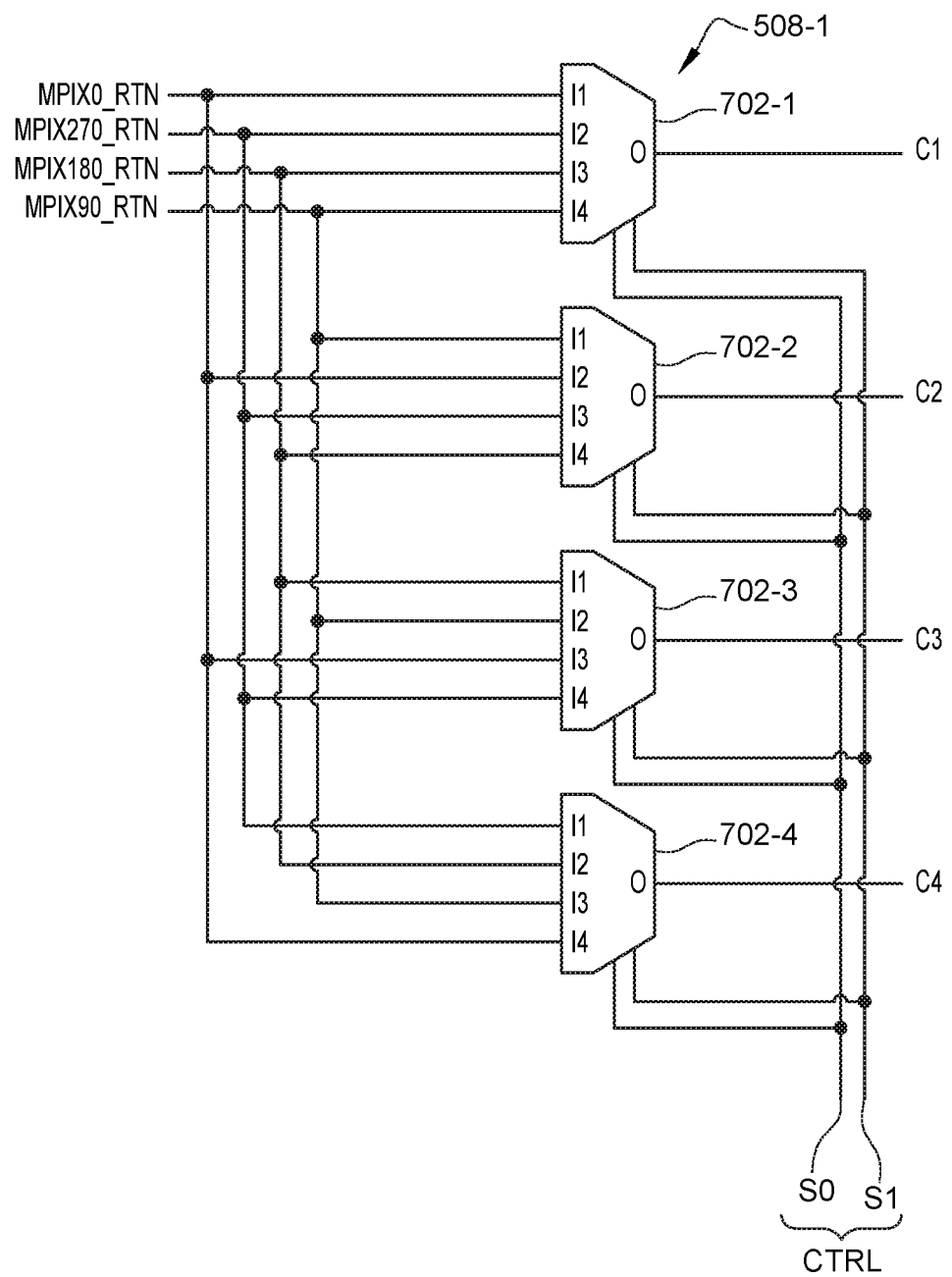
FIG. 20 illustrates a multiplexing circuit of the timing generator of FIG. 17 according to an example embodiment.

FIG. 20 illustrates a multiplexing circuit of the timing generator 500 of FIG. 17 according to an example embodiment.

In particular, FIG. 20 depicts the multiplexing circuit 508-1 coupled with the return array 102 according to an example embodiment. However, the following description may equally apply to the multiplexing circuit 508-2 coupled with the reference arrays 108-1 and 108-2.

According to one embodiment, the multiplexing circuit 508-1 comprises four multiplexers 702-1, 702-2, 702-3 and 702-4. Each multiplexer 702-1, 702-2, 702-3 and 702-4 is for example a 4:1 multiplexer. In the example of FIG. 20, each multiplexer 702-1, 702-2, 702-3 and 702-4 has four inputs (I1, I2, I3 and I4), and one output (O).

In the example of FIG. 20, the phase-shifted clock signals MPIX0_RTN, MPIX90_RTN, MPIX180_RTN and MPIX270_RTN are provided to the inputs I1, I2, I3 and I4 of the multiplexers 702-1, 702-2, 702-3 and 702-4 according to a cyclic circular shift. For example, as depicted in FIG. 20, the signal MPIX0_RTN is provided:
to the input I1 of the multiplexer 702-1;
to the input I2 of the multiplexer 702-2;
to the input I3 of the multiplexer 702-3; and
to the input I4 of the multiplexer 702-4.

The signal MPIX90_RTN is for example provided:
to the input I4 of the multiplexer 702-1;
to the input I1 of the multiplexer 702-2;
to the input I2 of the multiplexer 702-3; and
to the input I3 of the multiplexer 702-4.

The signal MPIX180_RTN is for example provided:
to the input I3 of the multiplexer 702-1;
to the input I4 of the multiplexer 702-2;
to the input I1 of the multiplexer 702-3; and
to the input I2 of the multiplexer 702-4.

The signal MPIX270_RTN is for example provided:
to the input I2 of the multiplexer 702-1;
to the input I3 of the multiplexer 702-2;
to the input I4 of the multiplexer 702-3; and
to the input I1 of the multiplexer 702-4.

Furthermore, as shown in FIG. 20, the multiplexers 702-1, 702-2, 702-3 and 702-4 respectively output the signals C1, C2, C3 and C4.

According to one embodiment, the multiplexers 702-1, 702-2, 702-3 and 702-4 are controlled by a two-bit control signal (CTRL). The two bits, denoted herein S0 and S1, of the CTRL control signal are for example binary signals, and the CTRL control signal thus has four different possible values. Each value of the CTRL control signal for example determines which of the inputs I1, I2, I3 and I4 of each of the multiplexers 702-1, 702-2, 702-3 and 702-4 is propagated to the input O of each of the multiplexers 702-1, 702-2, 702-3 and 702-4.

For example, for one value of the CTRL control signal, the multiplexers 702-1, 702-2, 702-3 and 702-4 output signals C1, C2, C3 and C4 that correspond to the input signals that are respectively provided to their inputs I1, that is MPIX0_RTN, MPIX90_RTN, MPIX180_RTN and MPIX270_RTN. For a further value of the CTRL control signal, the multiplexers 702-1, 702-2, 702-3 and 702-4 output signals C1, C2, C3 and C4 that correspond to the input signals that are respectively provided to their inputs I2, that is MPIX270_RTN, MPIX0_RTN, MPIX90_RTN and MPIX180_RTN. For yet a further value of the CTRL control signal, the multiplexers 702-1, 702-2, 702-3 and 702-4 output signals C, C2, C3 and C4 that correspond to the input signals that are respectively provided to their inputs I3, that is MPIX180_RTN, MPIX270_RTN, MPIX0_RTN and MPIX90_RTN. For yet a further value of the CTRL control signal, the multiplexers 702-1, 702-2, 702-3 and 702-4 output signals C, C2, C3 and C4 that correspond to the input signals that are respectively provided to their inputs I4, that is MPIX90_RTN, MPIX180_RTN, MPIX270_RTN and MPIX0_RTN.

The multiplexing circuit 508-1 is thus capable of providing four phase rotation settings to the pixel circuit 300 as described above with reference to FIGS. 13 to 16.

An advantage of the embodiments lies in the fact that the timing generator allows switching from one phase rotation setting to another during periods when the phase-shifted clock signals are not propagated to the multiplexing circuits 508-1, 508-2 thanks to the enable signals RTN_ENABLE_OUTPUT, REF_ENABLE_OUTPUT. This for example prevents glitches when switching from one phase rotation setting of the return array to the next. These advantages similarly apply to the reference arrays 108-1, 108-2.

A further advantage of the embodiments lies in the fact that the two enable signals RTN_ENABLE_OUTPUT and REF_ENABLE_OUTPUT allow to independently perform phase rotation on the return array 102 and on the reference array 108-1. This for example enables the reference array 108-1 to switch from one phase rotation setting to the next at a higher rate than the return array 102, thus leading to shorter exposure sub-phases for the reference array 108-1 than for the return array 102. This for example further allows the reference array 108-1 to perform both exposure and readout phases during each exposure phase of the reference array 102.

Various embodiments and variants have been described. Those skilled in the art will understand that certain features of these embodiments can be combined and other variants will readily occur to those skilled in the art. In particular, the number of phase rotation settings may be adapted to the application.

Moreover, although embodiments involving four bins BIN1, BIN2, BIN3 and BIN4 and four phase-shifted clock signals C1, C2, C3 and C4 have been described in the present disclosure, it will be apparent to those skilled in the art that the embodiments of the present disclosure may be adapted to any number of bins and a corresponding number of phase-shifted clock signals. In particular, the embodiments of the present disclosure may be adapted to two bins and two related phase-shifted clock signals, or to eight bins and eight related phase-shifted clock signals. Moreover, the number of bins and of related phase-shifted clock signals of the return array 102 may be different from the number of bins and of related phase-shifted clock signals of the reference arrays 108-1, 108-2.

Finally, the practical implementation of the embodiments and variants described herein is within the capabilities of those skilled in the art based on the functional description provided hereinabove. In particular, the practical method used for reading the pixels and storing the corresponding information is within the capabilities of those skilled in the art.

What is claimed is:

1. A depth map sensor comprising:
    a first array of first pixels, each first pixel comprising a first photodetector associated with a first pixel circuit comprising a first plurality of bins for accumulating events;
    a second array of second pixels, each second pixel comprising a second photodetector associated with a second pixel circuit comprising a second plurality of bins for accumulating events;
    a clock source configured to generate a plurality of phase-shifted clock signals;
    a first circuit having a plurality of first output lines coupled to the first array of first pixels, the first circuit configured to receive the plurality of phase-shifted clock signals, wherein the first circuit comprises a first sub-circuit and a second sub-circuit, the first sub-circuit configured to propagate the plurality of phase-shifted clock signals to the second sub-circuit during a first period determined by a first enable signal, wherein the propagation of the phase-shifted clock signals to the second sub-circuit is interrupted at an end of the first period and wherein the second sub-circuit is configured to select to which of the plurality of first output lines each of the plurality of phase-shifted clock signals is applied; and
    a second circuit having a plurality of second output lines coupled to the second array of second pixels, the second circuit receiving the plurality of phase-shifted clock signals from the clock source, wherein the second circuit comprises a third sub-circuit and a fourth sub-circuit, the third sub-circuit configured to propagate the plurality of phase-shifted clock signals to the fourth sub-circuit during a second period determined by a second enable signal and the fourth sub-circuit configured to select to which of the plurality of second output lines each of the plurality of phase-shifted clock signals is applied, wherein a duration of the second period is different from a duration of the first period.

2. The depth map sensor of claim 1, wherein the selection performed by the fourth sub-circuit is different from the selection performed by the second sub-circuit.

3. The depth map sensor of claim 1, wherein:
    the first array of first pixels is a return pixel array, adapted to be illuminated using a light source of the depth map sensor, the light source being configured to transmit light into an image scene; and
    the second array of second pixels is a reference array.

4. The depth map sensor of claim 1, wherein the depth map sensor is configured such that:
    a group of first photodetectors of the first array of first pixels of the depth map sensor is illuminated during a first exposure phase;
    the group of first photodetectors of the first array of first pixels of the depth map sensor is read during a first readout phase, following the first exposure phase; and
    a group of second photodetectors of the second array of second pixels of the depth map sensor is illuminated, during a second exposure phase, then read, during a second readout phase, the second exposure phase and the second readout phase being comprised in the first exposure phase of the group of first photodetectors.

5. The depth map sensor of claim 4, wherein the first exposure phase further comprises:
    a first exposure sub-phase, during which the plurality of phase-shifted clock signals are applied to the plurality of first output lines coupled to the first array of first pixels of the depth map sensor in a first order; and
    a second exposure sub-phase, during which the plurality of phase-shifted clock signals are applied to the plurality of first output lines coupled to the first array of first pixels of the depth map sensor according to a cyclic circular shift.

6. The depth map sensor of claim 4, wherein the second exposure phase further comprises:
    a third exposure sub-phase, during which the plurality of phase-shifted clock signals are applied to the plurality of second output lines coupled to the second array of second pixels of the depth map sensor in a second order; and
    a fourth exposure sub-phase, during which the plurality of phase-shifted clock signals are applied to the plurality of second output lines coupled to the second array of second pixels of the depth map sensor according to a cyclic circular shift.

7. The depth map sensor of claim 1, wherein the duration of the second period is between 50% and 95% of the duration of the first period.

8. The depth map sensor of claim 1, wherein the duration of the first period is between 10 µs and 20 µs.

9. The depth map sensor of claim 8, wherein the duration of the second period is between 50% and 95% of the duration of the first period.

10. A method of operating a depth map sensor, the method comprising:
    propagating, using a first sub-circuit of a first circuit comprising a plurality of first output lines coupled to a first array of first pixels, a plurality of phase-shifted clock signals received by the first circuit and generated by a clock source, to a second sub-circuit of the first circuit during a first period determined by a first enable signal, each first pixel comprising a first photodetector associated with a first pixel circuit comprising a first plurality of bins for accumulating events;

propagating, using a third sub-circuit of a second circuit comprising a plurality of second output lines coupled to a second array of second pixels, the plurality of phase-shifted clock signals received by the second circuit from the clock source, to a fourth sub-circuit during a second period with a duration different from a duration of the first period and determined by a second enable signal, each second pixel comprising a second photodetector associated with a second pixel circuit that comprises a second plurality of bins for accumulating events;

selecting, using the second sub-circuit, to which of the plurality of first output lines each of the plurality of phase-shifted clock signals is applied; and selecting, using the fourth sub-circuit, to which of the plurality of second output lines each of the plurality of phase-shifted clock signals is applied.

11. The method of claim 10, wherein the selecting performed by the fourth sub-circuit is different than the selecting performed by the second sub-circuit.

12. The method of claim 10, wherein the duration of the first period is between 10 µs and 20 µs and the duration of the second period is between 50% and 95% of the duration of the first period.

13. The method of claim 10, further comprising:
illuminating a group of first photodetectors of the first array of first pixels during a first exposure phase;
reading the group of first photodetectors of the first array of first pixels during a first readout phase that follows the first exposure phase;
illuminating a group of second photodetectors of the second array of second pixels during a second exposure phase; and
reading the group of second photodetectors of the second array of second pixels during a second readout phase that follows the second exposure phase, the second exposure phase and the second readout phase being comprised in the first exposure phase of the group of first photodetectors.

14. The method of claim 13, wherein the first exposure phase comprises:
a first exposure sub-phase, during which the plurality of phase-shifted clock signals are applied to the first output lines coupled to the first array of first pixels in a first order; and
a second exposure sub-phase, during which the plurality of phase-shifted clock signals are applied to the first output lines coupled to the first array of first pixels according to a cyclic circular shift.

15. The method of claim 14, wherein the second exposure phase further comprises:
a third exposure sub-phase, during which the plurality of phase-shifted clock signals are applied to the second output lines coupled to the second array of second pixels in a second order; and
a fourth exposure sub-phase, during which the plurality of phase-shifted clock signals are applied to the second output lines coupled to the second array of second pixels according to a cyclic circular shift.

16. A method of operating a depth map sensor, the method comprising:
generating a plurality of phase-shifted clock signals;
propagating the phase-shifted clock signals via first output lines to a first array of first pixels and via second output lines to a second array of second pixels, each first pixel comprising a first photodetector associated with a first pixel circuit comprising a first plurality of bins for accumulating events, each second pixel comprising a second photodetector associated with a second pixel circuit comprising a second plurality of bins for accumulating events, the phase-shifted clock signals being propagated to the first array of first pixels during a first period determined by a first enable signal and to the second array of second pixels during a second period having a duration different from a duration of the first period; and
selecting which of the first output lines and the second output lines each of the plurality of phase-shifted clock signals is applied.

17. The method of claim 16, wherein the selecting for the first output lines is different than the selecting for the second output lines.

18. The method of claim 16, further comprising:
illuminating a group of first photodetectors of the first array of first pixels during a first exposure phase;
reading the group of first photodetectors of the first array of first pixels during a first readout phase that follows the first exposure phase;
illuminating a group of second photodetectors of the second array of second pixels during a second exposure phase; and
reading the group of second photodetectors of the second array of second pixels during a second readout phase that follows the second exposure phase, the second exposure phase and the second readout phase being comprised in the first exposure phase of the group of first photodetectors.

19. The method of claim 18, wherein the first exposure phase comprises:
a first exposure sub-phase, during which the plurality of phase-shifted clock signals are applied to the first output lines coupled to the first array of first pixels in a first order; and
a second exposure sub-phase, during which the plurality of phase-shifted clock signals are applied to the first output lines coupled to the first array of first pixels according to a cyclic circular shift.

20. The method of claim 19, wherein the second exposure phase further comprises:
a third exposure sub-phase, during which the plurality of phase-shifted clock signals are applied to the second output lines coupled to the second array of second pixels in a second order; and
a fourth exposure sub-phase, during which the plurality of phase-shifted clock signals are applied to the second output lines coupled to the second array of second pixels according to a cyclic circular shift.

21. The method of claim 16, wherein the duration of the first period is between 10 µs and 20 µs and the duration of the second period is between 50% and 95% of the duration of the first period.

22. The method of claim 16, wherein the duration of the first period is between 10 µs and 20 µs.

* * * * *